US010430225B1

(12) United States Patent
Harland et al.

(10) Patent No.: US 10,430,225 B1
(45) Date of Patent: Oct. 1, 2019

(54) TRAFFIC MANAGEMENT ON AN INTERCONNECT

(71) Applicant: Amazon Technologies, Inc., Seattle, WA (US)

(72) Inventors: Jason Alexander Harland, Seattle, WA (US); Nathan Pritchard, Federal Way, WA (US); Michael Joseph Kentley, Bend, OR (US)

(73) Assignee: Amazon Technologies, Inc., Seattle, WA (US)

( * ) Notice: Subject to any disclaimer, the term of this patent is extended or adjusted under 35 U.S.C. 154(b) by 42 days.

(21) Appl. No.: 15/720,710

(22) Filed: Sep. 29, 2017

(51) Int. Cl.
| | |
|---|---|
| *G06F 13/38* | (2006.01) |
| *G06F 9/455* | (2018.01) |
| *G06F 13/42* | (2006.01) |
| *G06F 13/364* | (2006.01) |
| *H04L 1/16* | (2006.01) |

(52) U.S. Cl.
CPC ........ *G06F 9/45558* (2013.01); *G06F 13/364* (2013.01); *G06F 13/385* (2013.01); *G06F 13/4286* (2013.01); *H04L 1/16* (2013.01); *G06F 2009/45595* (2013.01); *G06F 2213/0016* (2013.01); *G06F 2213/0042* (2013.01); *G06F 2213/4004* (2013.01)

(58) Field of Classification Search
CPC ............... G06F 9/45558; G06F 13/385; G06F 13/4286; G06F 9/4558; G06F 2213/4004; G06F 2213/0016; G06F 2213/0042; G06F 2209/45595; H04L 1/16
See application file for complete search history.

(56) References Cited

U.S. PATENT DOCUMENTS

| | | | |
|---|---|---|---|
| 9,130,824 B2* | 9/2015 | Bhatia | ...................... G06F 13/42 |
| 2006/0174048 A1* | 8/2006 | Ohara | ...................... G06F 13/28 |
| | | | 710/305 |

(Continued)

OTHER PUBLICATIONS

I²C. [online]. Wikipedia.com, Aug. 7, 2017 [retrieved on Aug. 10, 2017]. Retrieved from the Internet: <URL: https://en.wikipedia.org/wiki/I%C2%B2C>, 16 pages.

(Continued)

*Primary Examiner* — Henry Tsai
*Assistant Examiner* — Christopher Daley
(74) *Attorney, Agent, or Firm* — Kilpatrick Townsend & Stockton LLP

(57) ABSTRACT

Disclosed herein are techniques for maintaining a secure execution environment on a server. In one embodiment, the server includes a bus manager circuit. The bus manager circuit comprises a first bus interface configured to be coupled with a first hardware device of the server, and a second bus interface configured to be coupled with a second hardware device of the sever. The bus manager further includes a control module. Under a first mode of operation, the control module is configured to receive an access request from the first hardware device to access the second hardware device, and responsive to determining not to grant the access request based on a pre-determined access policy, and block at least some of data bits corresponding to the access request from the second bus interface. The control module may also process the access request in a different manner under other modes of operations.

25 Claims, 12 Drawing Sheets

(56) References Cited

U.S. PATENT DOCUMENTS

| | | | | |
|---|---|---|---|---|
| 2007/0143606 A1* | 6/2007 | Bandholz | ............... | G06F 21/85 |
| | | | | 713/168 |
| 2007/0233455 A1* | 10/2007 | Zimmer | ............... | G06F 9/546 |
| | | | | 703/27 |
| 2010/0205600 A1* | 8/2010 | Tu | ............... | G06F 9/455 |
| | | | | 718/1 |
| 2013/0332605 A1* | 12/2013 | Kozlowski | ........... | G06F 9/5044 |
| | | | | 709/225 |
| 2017/0269943 A1* | 9/2017 | Kumar | ............... | G06F 9/4416 |
| 2018/0314828 A1* | 11/2018 | Harrison | ............... | G06F 9/4401 |

OTHER PUBLICATIONS

Valdez, Jonathan and Jared Becker, "Understanding the I2C Bus," *Application Report SLVA704*, Texas Instruments Incorporated (Jun. 2015), 8 pages.

\* cited by examiner

TRAFFIC MANAGEMENT ON AN INTERCONNECT

BACKGROUND

Many organizations provide computing services over a plurality of communication networks. The computing services may include, for example, network-based services such as storage or virtual servers that can be provided over the Internet to different clients. In some cases, servers may be rented out to clients based on need or usage. In such instances, it may be desirable to provide secure environments for the clients to execute without interfering with each other, while also managing clients and the operating environments on the servers.

BRIEF DESCRIPTION OF THE DRAWINGS

Various embodiments in accordance with the present disclosure will be described with reference to the drawings, in which.

DETAILED DESCRIPTION

Figure 1:
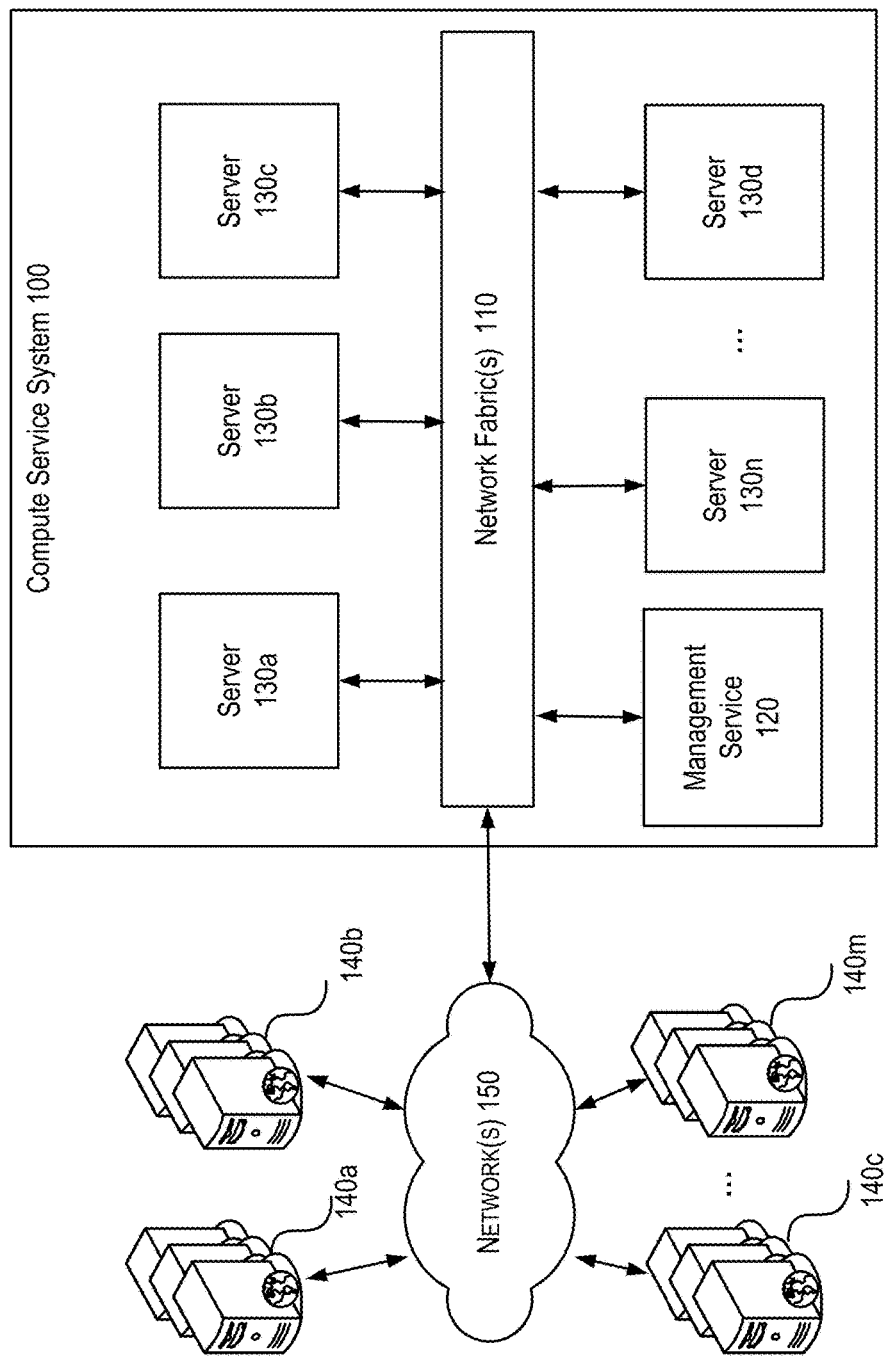
FIG. 1 illustrates an example compute service system in a network-based service environment, according to certain aspects of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

A compute service system may typically include a plurality of servers that can host data and be used by multiple clients or organizations to run instances, such as virtual machine instances or bare-metal instances (e.g., operating systems that run directly on the server hardware). In most cases, instances, such as bare-metal or virtual machine instances, in a multi-tenant compute service system may be allocated to a client when the client needs them and decommissioned when they are no longer needed, such that the resources can be reallocated to other clients. In the present disclosure, the terms "tenant," "client," and "customer" may be used interchangeably. These terms do not necessarily require the presence of a commercial relationship. The term "instance" may refer to, for example, an instance that is executed directly on server hardware or as a virtual machine. Different types of instances generally provide different hardware functions or arrangements.

Typically, the operator of the compute service uses its own virtualization system (e.g., a hypervisor or virtual machine monitor) on the servers and the clients only receive access to the instances. In some cases, a client may prefer to run directly on the server's hardware or use its own virtualization system to instantiate its own virtual machines as needed. For example, a client may want to use a customer hypervisor, make specific changes to a commercially available hypervisor to enable certain models, or prefer one hypervisor over another, e.g., Microsoft Hyper-V® over VMware vSphere® or open-source Kernel-based Virtual Machine (KVM). In addition, in a virtualized compute service system, performance degradation may occur due to the introduction of a hypervisor layer. While the hypervisor enables the visibility, flexibility, and management capabilities required to run multiple virtual machines on the same resources, it also creates additional processing overhead and may not integrate with tools the user wants to use with the hypervisor. However, if access to the hardware is granted a customer could potentially damage the hardware or attempt to modify the firmware to attack future customers that use the hardware.

For example, in a bare-metal environment, a customer may try to modify the firmware on the server to adversely affect the execution environment when the server is rebooted and rented to a second customer. The firmware may, for example, direct data on the server to an unsecure location, thus compromising the security of the data of the second client on the server.

Embodiments of the present disclosure relate to maintaining a secure execution environment on servers in a compute service system. The secure execution environment may comprise a data traffic manager that controls data traffics between internal components of a server. The data traffics can occur on a set of hardware interconnects (e.g., buses) on a motherboard, and can include access requests (e.g., a read request, a write request, etc.) as well as data associated with the requests (e.g., address, write data, read data, etc.). The requests and the data can be part of a communication transaction. The data traffic manager can include bridge circuits interposed between the internal components, to gate the transmission of access requests and the associated data. The data traffic manager further includes control logics to examine the access requests and the associated data, and to determine whether or not to allow the associated transaction to go through based on pre-determined access policies. Based on the pre-determined access policies, the data traffic manager can disallow certain communication transactions such as, for example, writing data to certain protected regions of non-volatile memories that store the firmware, configuring a platform manager to change an operation state of the server, providing access to client data, etc.

Different accessibilities to different regions of the non-volatile memory at different times by different components may be controlled by the data traffic manager. For example, in a pass-through mode, some or all regions of the non-volatile memory may be readable by some or all components of the server, and some or all regions of the non-volatile memory may be writable by some or all components of the server. In a filtering mode, some or all regions of the non-volatile memory may not be readable by some or all components of the server, and some or all regions of the non-volatile memory may not be writable by some or all components of the server. Additionally, in the filtering mode, some untrusted components of the server, for example, components that may have unsecure network access, such as a BMC, may be disconnected from, for example, the processor, the platform manager, etc., such that the client execution environment, the client data, as well as various management functions of the server may not become accessible to the untrusted components of the server. Besides filtering mode, the data traffic manager may support other operation modes such as a pass-through mode, in which requests to all regions of the non-volatile memory are granted, as well as disabled mode, in which no request to the non-volatile memory is granted. The data traffic manager can implement different operation modes when processing requests from different devices, and for accessing different devices in addition to the non-volatile memory, to provide different accessibilities among different devices.

It is noted that although embodiments in the present disclosure describe securing firmware or other data or code stored on non-volatile memory, techniques disclosed herein can be used to secure any user-accessible volatile or non-volatile memory, any user accessible hardware components, any user accessible software, any user accessible database, and/or any user accessible firmware. For example, techniques disclosed herein can be used to protect any software that a user can execute on a server, either directly or remotely through a network, such as via an unsecured agent (e.g., the BMC), where the software may be stored in volatile or non-volatile memory.

In addition to improving security, the data traffic manager can also improve the flow of data traffic on the set of hardware interconnects. For example, the hardware interconnects may operate in a master-slave mode where a device exerts control over another device during a communication transaction, and may support a multi-master and multi-slave topology. In such a case, the bridge structure of the data traffic manager allows selective decoupling between the master devices and the slave devices. The decoupling allows the data traffic manager to provide more robust arbitrations among a set of master devices that seek to communicate with (and control) a particular slave device, which can reduce the occurrences of contentions and excessive back-offs. All these can improve the performance of the hardware interconnect and reduce waste of hardware resources.

FIG. 1 illustrates an example compute service system 100 in a network-based service environment, according to certain aspects of the present disclosure. In the network-based service environment, one or more clients may utilize client devices 140a-140m (collectively, client devices 140) to access compute service system 100 via one or more networks 150. For example, client devices 140 may access compute service system 100 using a web browser, a command line interface, or a web service API. Client devices 140 may include any appropriate device operable to send and receive requests, messages, or other information over an appropriate network 150 and convey information back to a client of the device, such as, but not limited to, a mobile phone, a smart phone, a Personal Digital Assistant (PDA), a laptop computer, a desktop computer, a thin-client device, a tablet, an electronic book (e-book) reader, etc.

In some examples, networks 150 may include any one or a combination of many different types of networks, such as cable networks, the Internet, wireless networks, cellular networks, and other private and/or public networks. Communications over the networks may be enabled by wired or wireless connections and combinations thereof. Networks 150 may support communications using any of a variety of commercially-available protocols, such as Transmission Control Protocol/Internet Protocol (TCP/IP), Open System Interconnection (OSI), File Transfer Protocol (FTP), Universal Plug and Play (UpnP), Network File System (NFS), Common Internet File System (CIFS), and AppleTalk®.

Compute service system 100 may include a management service 120 and a plurality of servers 130a, 130b, 130c, 130d, . . . , and 130n (collectively, servers 130) in a distributed computing environment. Management service 120 and servers 130 may be communicatively coupled to one or more network fabrics 110, which may be connected to networks 150 through, for example, high speed network connection, such as InfiniBand, Data Center Ethernet (DCE), gigabit Ethernet, fiber channel, or Fiber Channel over Ethernet (FCoE) etc. Network fabrics 110 may be any appropriate network, including an intranet, the Internet, a cellular network, a local area network, or any combination thereof. Network fabrics 110 may support communications using any of a variety of high speed communication protocols.

Servers 130 may include one or more servers or servers, arranged in a cluster as a server farm, or as individual servers not associated with one another. These servers may be configured to host instances. In some implementations, each server of servers 130 may have identical or similar hardware resources. In some implementations, servers 130 may include a plurality of different types of servers that may have different resources and/or configurations.

Management service 120 may be a server or platform that is configured to manage a pool of heterogeneous resources (e.g., servers or specialized hardware resources), provide access to clients and end users, monitor security, and manage resource allocation. For example, management service 120 may receive requests from client devices 140 and select one or more servers 130 to provision the requested instance based on the specific request from the client. In some cases, management service 120 may allocate a predetermined number of resources to a client who may pay a flat fee or a monthly fee. In some cases, for a client that is charged on a pay-per-use basis, management service 120 may allocate resources to the client when the client needs them and decommission them when they are no longer needed, such that the resources can be allocated to other clients. Management service 120 may include a network interface for communication with network fabrics 110, a database for storing configurations and status of servers 130 connected to network fabrics 110, and a processing logic for selecting one or more available servers for an instance and performing other management functions.

As described above, client devices 140 may request different types of instances (e.g., virtual machines or servers) from compute service system 100. For example, in some cases, a client may request an instance to perform complex computational workloads, such as batch processing, distributed analytics, high performance scientific or engineering applications, gaming, or video-encoding. In some cases, a client may request an instance for applications sensitive to network performance.

In some cases, a client may request a specific system hardware configuration. For example, the client may specify the number of processor cores, the size of the memory, the size of the storage device (e.g., a solid state drive (SSD)), and/or the operating system or Virtual Machine Monitor (VMM, i.e., hypervisor) needed for the applications. In some cases, the client may select a type of instance from multiple types of instances offered by the compute service system. For example, a computing service provider may offer different types or families of instances based on compute, memory, and storage capabilities, where different types of instances may provide different capabilities on computing performance, I/O performance, memory size and performance, storage size and performance, network performance, and graphic processing performance. And, in some cases, the client may request a particular operating system or hypervisor to run on the server, such as Microsoft Windows®, Linux, Microsoft Hyper-V®, Xen®, or VMware vSphere®. In some cases, the client may request a specific type of hardware, such as GPUs or SSDs. As such, in embodiments of the present disclosure the compute service provider may offer one or more "bare-metal" instance types. The bare-metal instance types can have differing combinations of hardware.

In some cases, a client's workloads and applications may demand higher performance than the virtualization layer allows, or the client may want to use a different virtualization system on hardware managed by the compute service provider. The client may rent a server as a bare-metal instance and use its own operating system on the server, in order to remove the hypervisor and the performance impact caused by virtualization. The hardware of the bare-metal instance may be fully dedicated to the client, including any additional storage, during the time period that the sever is rented to the client.

In response to network service requests for a bare-metal instance from a client, management service 120 may select one or more servers to allocate to the client. For example, in implementations where the servers may have different hardware resources, management service 120 may select a server that best matches the requirement of the client-requested instance with minimum extra resources. In implementations where all servers have the same or similar hardware resources, management service 120 may randomly select any available server, or a cluster of available servers that are closely located. In some implementations, management service 120 may select a server that is capable of provisioning a bare-metal instance.

Figure 2:
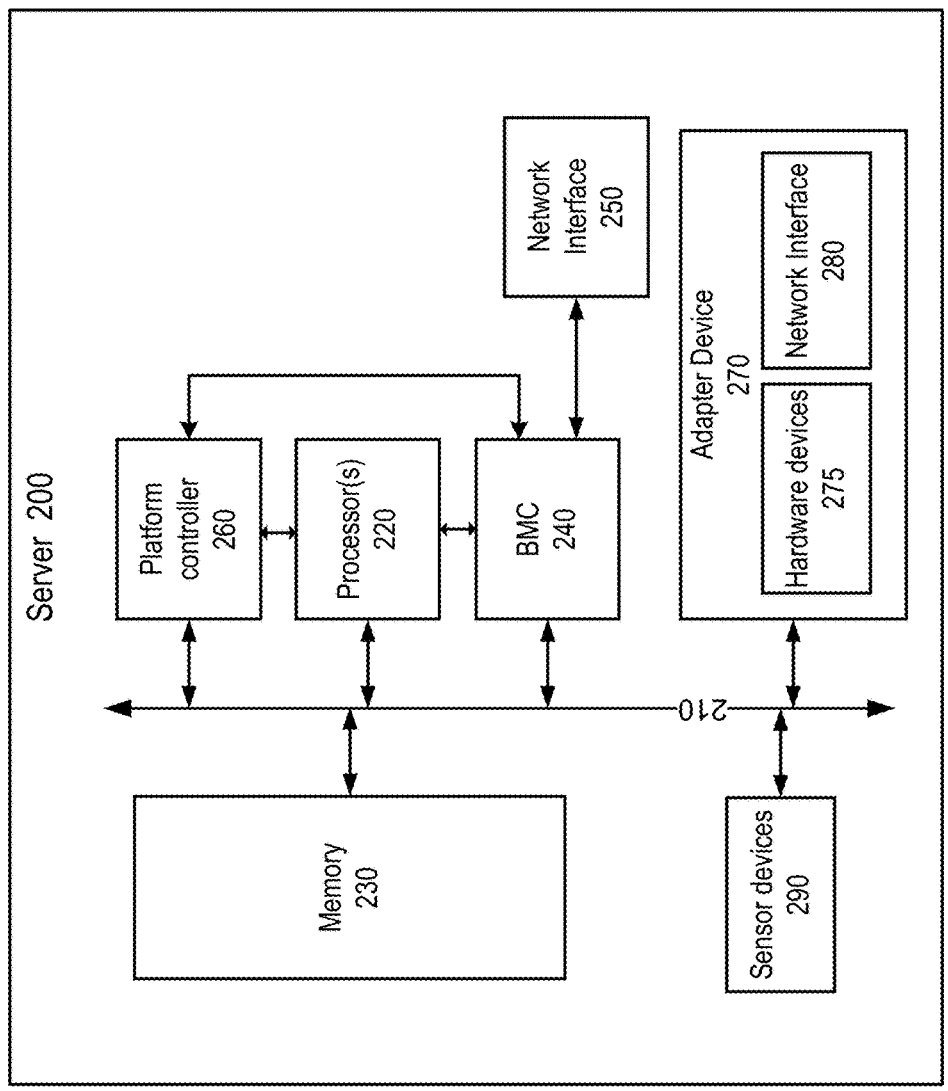
FIG. 2 is a simplified block diagram of an example server in a compute service system, according to certain aspects of the present disclosure.

FIG. 2 is a simplified block diagram of an example server 200 in a compute service system, according to certain aspects of the present disclosure. Many components or modules of server 200 are omitted in FIG. 2 in order not to obscure the features being described herein. One skilled in the relevant art will appreciate that the disclosed illustrative components are not meant to be an exhaustive identification of all the components required by or present in a server. Rather, illustrative components have been identified, in a non-limiting manner, to facilitate illustration of one or more aspects of the present disclosure. Still further, the illustrative components of server 200 may be logical in nature such that the physical implementation of one or more components can be varied or such that one or more of the logical components may be implemented in a virtualized manner. Additionally, one or more servers 200 may share one or more of the illustrated or unillustrated components, such as processors, graphical processing units, memory, storage, and the like.

In an illustrative embodiment, server 200 may be associated with various hardware components, software components, and respective configurations that facilitate the execution of client applications. In some implementations, server 200 may provide a multi-tenant platform to multiple clients through multiple adapter devices. In some embodiments, server 200 may be dedicated to a client at a given time, while no other client may have access to server 200 at the same time.

Specifically, in the example embodiment shown in FIG. 2, server 200 may include one or more adapter devices, such as an adapter device 270. Communications between adapter device 270 and other components of server 200 may be performed using one or more communication channels 210, which may use interfaces such as Peripheral Component Interconnect (PCI) interfaces, PCI Express (PCIe) interfaces, PCI Extended (PCI-X) interfaces, or any other suitable interfaces. Communication channels 210 may include one or more buses, meshes, matrices, fabrics, a combination of these communication channels, or some other suitable communication channels. For example, communication channel 210 may correspond to a shared bus (e.g., a front side bus, a memory bus), a point-to-point bus such as a PCI or PCIe bus, etc., in which the components of server 200 communicate.

Server 200 may be a server, for example, an x86 server. Server 200 may include one or more processors 220, which may include, for example, one or more x86 processor cores, or other circuits capable of executing machine-readable instructions. In some embodiments, processor(s) 220 may also include GPUs. Processor(s) 220 may include application specific integrated circuits (ASICs), field programmable gate arrays (FPGAs), systems-on-chip (SoCs), network processing units (NPUs), processors configured to execute instructions, or any other circuitry configured to perform logical arithmetic and floating point operations. Examples of processors that may be included in processor(s) 220 may include processors developed by ARM®, MIPS®, AMD®, Intel®, Qualcomm®, and the like. In certain implementations, processor(s) 220 may include multiple processors or processing cores, wherein each processing core may be configured to execute instructions independent of other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores, or processing threads executing on the same core may share certain resources, such as, for example, busses, level 1 (L1) caches, and/or level 2 (L2) caches. The instructions executed by processor(s) 220 may be stored on a computer-readable storage medium, for example, in the form of a computer program.

In some implementations, server 200 may include a second processor, such as a baseboard management controller (BMC) 240 for managing the operation of server 200 in accordance with, for example, the Intelligent Platform Management Interface (IPMI) standard. BMC 240 may be connected to a network through a network interface 250, such as an Ethernet connection. A system administrator may communicate with BMC 240 through network interface 250.

BMC 240 may include a processing logic that monitors the physical states of server 200 using sensors controlled by platform controller 260 and communicate with a system administrator using an independent network connection through network interface 250. Different types of sensors may be built into server 200 and controlled by platform controller 260. The sensors may measure internal physical parameters, such as temperature, humidity, power-supply voltage, fan speeds, communications parameters, and operating system functions, and report to BMC 240. The sensors can be on the motherboard, and/or on other components of the server including, for example, hardware devices 275 of adapter device 270, as well as sensor device 290, to measure the physical parameters of adapter device 270. BMC 240 may monitor the sensors and send alerts to a system administrator via the network if any of the parameters does not stay within preset limits, indicating a potential failure or risk of the system.

BMC 240 may provide management and monitoring capabilities independently of processor(s) 220, the firmware (e.g., Basic Input/Output System (BIOS)), and the operating system of server 200. BMC 240 may be used by system administrators for monitoring and managing the operations of server 200, using, for example, IPMI interfaces. For example, a system administrator may, using BMC 240 through IPMI interfaces, manage a server that may be powered off or otherwise unresponsive through a network connection to BMC 240, or login independent of the operating system to manage server 200 remotely even in the absence of an operating system or a system management software.

In some embodiments, system administrators may use BMC 240 to monitor status of server 200, including physical parameter information such as temperatures, voltages, fans, power supplies, chassis intrusion, etc. BMC 240 may also monitor operation statuses of different components such as processor(s) 220, adapter device 270, etc. by, for example, reviewing hardware logs. BMC 240 may also take some corrective actions including, for example, performing recovery procedures such as resetting or rebooting server 200 to get a hung operating system running again or power down server 200 if necessary, from a remote console through a network connection, such as an Ethernet connection via network interface 250. In this way, a system administrator can remotely manage numerous servers and other devices simultaneously, saving on the overall operating cost of the network and helping to ensure its reliability.

In some embodiments, processor(s) 220 may also implement a hardware-based management mechanism, and can interface with BMC 240 to perform the aforementioned roles of system administrators. For example, processor(s) 220 may issue a request to BMC 240 to provide hardware and/or software status information, perform various kinds of diagnostics based on the status information to identify a hardware and/or software issue (e.g., hanging, bandwidth bottleneck, etc.), and provide solutions (e.g., in the form of configurations, reset commands, etc.) to resolve the identified hardware and/or software issue.

Server 200 may also include a platform controller 260. Platform controller 260 control certain data paths and support functions used in conjunction with processor(s) 220. For example, platform controller 260 may provide processor(s) 220 with access to display devices, peripherals (e.g., keyboard, mouse, etc.), media processing circuits, clocking circuits, etc. Platform controller 260 may also interface with other components of server 200, such as BMC 240. For example, platform controller 260 may also implement a hardware-based management mechanism (e.g., in combination with or in lieu of processor(s) 220), and can interact with BMC 240 to provide hardware and/or software status information, perform various kinds of diagnostics based on the status information to identify a hardware and/or software issue (e.g., hanging, bandwidth bottleneck, etc.), and provide solutions (e.g., in the form of configurations, reset commands, etc.) to resolve the identified hardware and/or software issue. In a case where platform controller 260 does not implement the aforementioned hardware-based management mechanism, platform controller 260 may also receive request from BMC 240 and transmit operation data (e.g., physical parameter information, hardware status, etc.) to BMC 240 in response to the request. In some embodiments, platform controller 260 may include a chipset such as, for example, Intel® platform controller hub (PCH).

Server 200 may also include a memory 230, which may include non-transitory executable code, often referred to as firmware, which can be executed by processor(s) 220 to cause components of server 200 to initialize and identify system devices such as the video display card, keyboard and mouse, hard disk drive, optical disc drive, and other hardware. Memory 230 may also include firmware for BMC 240 and platform controller 260. Memory 230 may be connected to (or in communication with) a number of components of server 200, such as processor(s) 220, BMC 240, platform controller 260, and the like, using, for example, one or more communication channels 210, such as Serial Peripheral Interface (SPI) buses, Inter-Integrated Circuit ($I^2C$) buses, Serial Advanced Technology Attachment (SATA) buses, or other suitable buses. Memory 230 may also include or locate boot loader software that may be utilized to boot server 200. For example, in one embodiment, memory 230 may include executable code that, when executed by processor(s) 220, causes server 200 to attempt to locate Preboot Execution Environment (PXE) boot software. In some embodiments, memory 230 may include a flash memory or a read-only memory (ROM). In some embodiments, memory 230 may also include volatile memory device including, for example, a random access memory (RAM), dynamic random access memory (DRAM), or a synchronous dynamic random-access memory (SDRAM), such as double data rate (DDR), DDR2, DDR3, or DDR4 SDRAM. In some embodiments, the memory module may include several levels of cache hierarchy, such as Level 1 (L1) caches, Level 2 (L2) caches, Level 3 (L3), or last level caches. In some embodiments, server 200 may include one or more controllers for managing internal or peripheral devices (not shown) of server 200, such as hard drives or other forms of memory. One example of the controllers may be a SATA hard drive controller. Although FIG. 2 illustrates memory 230 as a single device, it is understood that memory 230 may include two or more memory devices, where each memory device may store firmware for a component of server 200, such as processor(s) 220, BMC 240, platform controller 260, etc.

Adapter device 270 may include, for example, a processing logic (e.g., a processor), non-volatile memory (e.g., flash memory), and volatile memory (e.g., RAM). In some embodiments, adapter device 270 may be coupled to server 200 using, for example, a plug-in card or soldered to the motherboard of server 200. Adapter device 270 may provide various functions, such as traffic monitoring, traffic shaping, computing, billing, encryption, etc. Adapter device 270 may also provide physical and virtual services to server 200 and/or virtual processes running on server 200. In some embodiments, adapter device 270 may communicate as a standard bridge component for facilitating access between various physical and emulated components of server 200 and one or more network fabrics, such as network fabrics 110, using a network interface 280. In some embodiments, adapter device 270 may include embedded microprocessors to allow the adapter device to execute computer executable instructions related to the implementation of management functions, or to execute other computer executable instructions related to client applications. In some embodiments, adapter device 270 may be implemented using multiple discrete hardware elements, such as multiple cards, multiple integrated circuits, or other devices. In some embodiments, adapter device 270 may be attached externally to server 200. In some embodiments, adapter device 270 may be integrated into server 200. In various embodiments, adapter device 270 may include reconfigurable hardware resources such that they can be dynamically configured into different hardware configurations or to provide different hardware functionalities.

In some implementations, network interface 280 may include hardware and/or software configured to implement a protocol for communicating with externally connected devices or functions. For example, network interface 280 may include hardware and/or software for communicating with a network. Network interface 280 may, for example, include physical connectors or physical network ports for wired connection to a network, and/or antennas for wireless communication to a network. Network interface 280 may further include hardware and/or software configured to implement a network protocol stack. Network interface 280 may communicate with a network using a network protocol, such as, for example, TCP/IP, InfiniBand, Remote Direct Memory Access (RDMA) over Converged Ethernet (RoCE), Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, adapter device 270 may include multiple network interface modules, each configured to communicate with a different network, such as a wired Ethernet network, a wireless 802.11 network, a cellular network, or an InfiniBand network, etc.

Besides network interface 280, adapter device 270 may include other hardware devices 275, such as sensors to provide physical parameters information (e.g., temperature, humidity, power-supply voltage, fan speeds, communications parameters, operating system functions, etc.) of adapter device 270 to BMC 240, as discussed above. Moreover, although not shown in FIG. 2, hardware devices 275 may include other components or modules, such as mass storage controllers, network controllers, display controllers, memory controllers, serial bus controllers, wireless controllers, or encryption and decryption controllers, among others. For example, adapter device 270 may include a non-volatile memory that stores firmware that can be executed by a processor to cause components of adapter device 270 to initialize and identify modules of the adapter device. The non-volatile memory may include boot loader software that will be utilized to boot adapter device 270. The non-volatile memory may also include firmware that may be used to configure and boot adapter device 270 for performing different hardware functionalities based on client requests. In some embodiments, the non-volatile memory may include a flash memory. In some embodiments, the non-volatile memory for adapter device 270 may be the same as memory 230. Some or all of hardware devices 275 may be accessible to, for example, BMC 240 (e.g., sensors), processor(s) 220, platform controller 260, etc.

In some implementations, adapter device 270 may be a PCI-based device. In these implementations, adapter device 270 may include a PCI interface for communicating with other components of server 200. The term "PCI" may be used to describe any protocol in the PCI family of bus protocols, including the original PCI standard, AGP, PCIe, and PCI-X. The PCI protocols are standard bus protocols for connecting local peripheral devices to servers. A standard bus protocol is a data transfer protocol for which a specification has been defined and adopted by various manufacturers. Manufacturers ensure that compliant devices are compatible with computing systems implementing the bus protocol and vice versa. As used herein, PCI-based devices also include devices that communicate using Non-Volatile Memory Express (NVMe), which is a device interface specification for accessing non-volatile storage media attached to a computing system using PCIe.

In some embodiments, various components and modules of adapter device 270 and server 200 described above may be implemented as discrete components, as a System-on-Chip (SoC), as an ASIC, as a NPU, as an FPGA, or any combination thereof.

Figure 3:
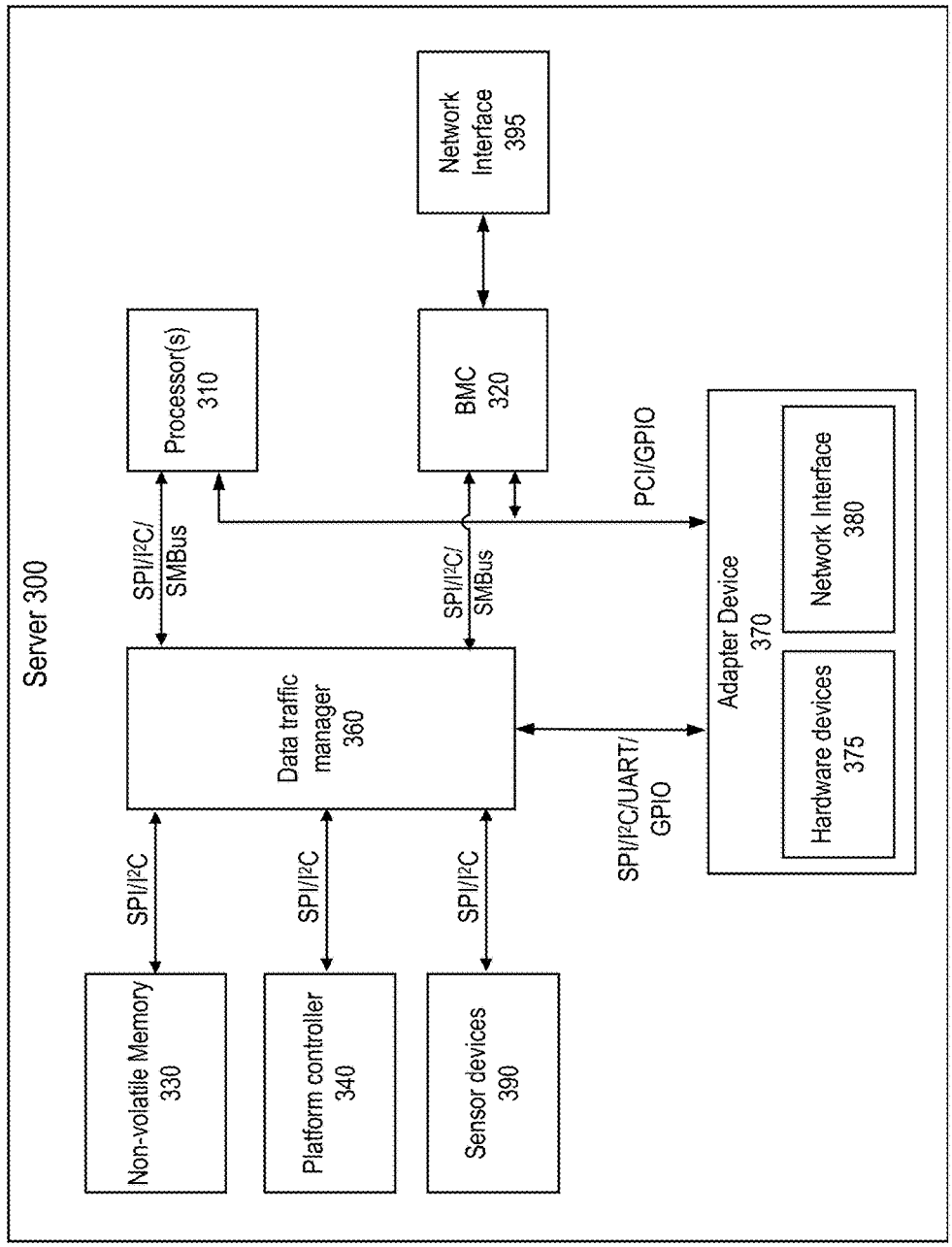
FIG. 3 illustrates an example server configured to provide virtualized services in a compute service system, according to certain aspects of the present disclosure.

FIG. 3 is a simplified block diagram of an example server 300 configured to host bare-metal instances, according to certain aspects of the present disclosure. As in FIG. 2, many components or modules of server 300 are omitted in FIG. 3 in order not to obscure the features being described herein. One skilled in the relevant art will appreciate that the disclosed illustrative components are not meant to be an exhaustive identification of all the components required by or present in a server. Rather, illustrative components have been identified, in a non-limiting manner, to facilitate illustration of one or more aspects of the present application. Still further, the illustrative components of server 300 may be logical in nature such that the physical implementation of one or more components can be varied or such that one or more of the logical components may be implemented in a virtualized manner.

As server 200 of FIG. 2, server 300 may include one or more adapter devices, such as an adapter device 370. Communications between adapter device 370 and other components of server 300 may be performed using interfaces such as PCI interfaces, PCIe interfaces, PCI-X interfaces, SPI interfaces, I$^2$C interfaces, or any other suitable interfaces. For example, hardware devices 375 may include sensor devices to transmit physical parameters information (e.g., temperature, humidity, power-supply voltage, fan speeds, communications parameters, operating system functions, etc.) of adapter device 370 via I$^2$C interfaces. Further, hardware devices 375 may also include non-volatile memory devices, control/debug registers, etc. that are accessible by other devices (e.g., processor(s) 310, platform controller 340, etc.) via I$^2$C interfaces.

Server 300 may include one or more processors 310, which may be similar to processor(s) 220 of FIG. 2 as described above. Server 300 may also include a special-purpose processor BMC 320 for managing the operation of server 300 in accordance with, for example, the IPMI standard. BMC 320 may be similar to BMC 240 of FIG. 2. A system administrator may communicate with BMC 320 through a network interface 395. Network interface 395 may be similar to network interface 350 of FIG. 2. Server 300 may also include platform controller 340. The I$^2$C devices may include sensors (e.g., sensor devices 375) for measuring physical parameters on server 300, such as temperature, humidity, power-supply voltage, fan speeds, communications parameters, and operating system functions. In some embodiments, the sensors may use a communication interface different from I$^2$C, such as, for example, IPMB, SPI, System Management Bus (SMBus), etc. Platform controller 340 may be similar to platform controller 260 of FIG. 2.

Server 300 may also include a non-volatile memory 330, which may store firmware for various components of server 300, such as processor(s) 310, BMC 320, platform controller 340, and other system devices such as the video display card, keyboard and mouse, hard disk drive, optical disc drive, and other hardware. Non-volatile memory 330 may be accessible, using, for example, SPI, I²C, or SMBus buses. Server 300 may also include sensor devices 390 to provide physical parameter information of the motherboard.

As adapter device 270 of FIG. 2, adapter device 370 may be coupled to server 300 using, for example, a plug-in card or soldered to the motherboard of server 300. Adapter device 370 may provide various functions, such as traffic monitoring, traffic shaping, computing, billing, or encryption, etc. Adapter device 370 may be accessible using, for example, I²C and PCIe buses. Adapter device 370 may also access sensor devices 390 via, e.g., I²C interfaces.

To create a bare-metal execution environment, other components or modules may be added to server 300, in addition to these components or modules that are similar to the corresponding components or modules in server 200 of FIG. 2. For example, a data traffic manager 360 may be added on the data path from processor(s) 310, BMC 320, platform controller 340, or other components of server 300 to non-volatile memory 330 that can execute or store software/firmware. Data traffic manager 360 may include or be part of a programmable security logic, and may include one of an FPGA, an SoC, an ASIC, a programmable array logic (PAL), and a complex programmable logic device (CPLD). In addition, data traffic manager 360 also includes interface circuits for interfacing with, for example, SPI, I²C, or SMBus.

To access non-volatile memory 330, processor(s) 310, BMC 320, platform controller 340, commands are routed through data traffic manager 360 using, for example, SPI, I²C, or SMBus, etc. Data traffic manager 360 can analyze, block, throttle, and/or filter commands sent to non-volatile memory 330. As used herein, throttling commands send to non-volatile memory may include only granting a limited number of read or write requests to access the non-volatile memory per unit time, such as per second, or only granting a limited number of read or write requests to access a region in the non-volatile memory per unit time. Data traffic manager 360 may maintain a blacklist of protected regions or a whitelist of unprotected region in non-volatile memory 330, and may control the accessibility of different regions in non-volatile memory 330 by processor(s) 310, BMC 320, platform controller 340, or an untrusted components at different times based on the blacklist (or whitelist). Data traffic manager 360 may receive the blacklist and whitelist information from other components, such as processor(s) 310, platform controller 340, adapter device 370, etc., via a dedicated bus, such as Universal Asynchronous Receiver/Transmitter (UART) bus, general-purpose input/output (GPIO), etc.

In addition, data traffic manager 360 can also analyze, block, and/or filter commands sent to other components/devices of server 300, to implement a set of access policies governing how one component of server 300 can access another component of server 300. For example, an untrusted component, such as BMC 320, may be authorized to access a certain set of sensor data from adapter device 370 (e.g., from sensor devices 375), from platform controller 340 (e.g., sensor data transmitted from display devices, peripherals, etc.), etc. However, BMC 320 may not be authorized to access client data stored in non-volatile memory 330, nor can BMC 320 request the client data from processor(s) 310. Data traffic manger 360 can receive an access request from BMC 320 and, based on one of more attributes associated with the access request (e.g., based on an address of the targeted device for the request), determine whether to block or forward the access request to the targeted device. The set of access policies can also be in the form of a blacklist (or whitelist) communication transactions, which data traffic manager 360 can receive from other components, such as processor(s) 310, platform controller 340, adapter device 370, etc., via a dedicated bus such as UART, GPIO, etc.

When performing the above functions, data traffic manager 360 may operate in various modes. For example, data traffic manager 360 may operate in one of three operation modes: a filtering mode, a pass-through mode, and a disabled mode. Under the filtering mode, an access request may be filtered based on the aforementioned blacklists/whitelists. Under the pass-through mode, the access request may be forwarded unconditionally provided that the access request is a valid request (e.g., including a correct target device address). The logical behaviors of a slave device and a master device connected via data traffic manager 360 operating under the pass-through mode may be equivalent to the slave device and the master device being directly connected to each other. On the other hand, under the disabled mode, data traffic manager 360 may deny unconditionally any access request received from the master device.

Data traffic manager 360 may be configured to operate in the filtering mode, the pass-through mode, or the disabled mode at different times based on external instructions (e.g., from processor(s) 310, platform controller 340, adapter device 370, etc.), or based on a status of server 300. The operation mode can also be specific for a particular requesting device, and for a particular target device to receive and process a request.

As an example, when server 300 is in a power-up stage, it may undergo a process of verifying and/or updating firmware stored in non-volatile memory. During the power-up stage, data traffic manager 360 may allow only a trusted component (e.g., adapter device 370, etc.) to read and update the firmware stored in non-volatile memory 330, while disabling all other communications between other components. Accordingly, in the power-up state, data traffic manager 360 may operate in a filtering mode to process access request to non-volatile memory, and allow only read and write access request from the trusted component (e.g., adapter device 370) targeted at a specific region of non-volatile memory 330 that stores the firmware. Data traffic manager 360 may also operate in a disabled mode when processing all other access requests targeted at non-volatile memory 330 from other server components/devices (e.g., processor(s) 310) during the power-up state.

On the other hand, during normal operation of server 300, data traffic manager 360 may implement a different set of access policies. For example, data traffic manger 360 may also provide the hardware-based management mechanism of platform controller 340 (and/or processor(s) 310) with unrestricted access to BMC 320 (e.g., to control BMC 320 to reset the server), etc. Accordingly, data traffic manager 360 may operate in the pass-through mode when processing access requests from platform controller 340 and/or processor(s) 310 targeted at BMC 320. As another example, BMC 320 may also be granted to restricted access to certain status information provided by processor(s) 310 and platform controller 340, to transmit the status information to a remote administrator via network interface 395. In this case, data traffic manger 360 may operate in the filtering mode when processing access requests from BMC 320 targeted at processor(s) and/or platform controller 340, and only allow access requests directed to, for example, a set of status registers in processor(s) 310 and platform controller 340, to go through. As another example, data traffic manger 360 may also allow processors(s) 310 and platform controller 340 to access part of non-volatile memory 330 (e.g., to read firmware data, to read/write data stored in part of non-volatile memory 330 allocated to the client, etc.) under the filtering mode, and to access another part of non-volatile memory 330 that stores client data under the pass-through mode. Data traffic manager 360 may also use disabled mode to block access request directed to the part of non-volatile memory 330 from an untrusted device (e.g., BMC 320), to prevent the untrusted device from accessing client data.

Referring back to FIG. 3, data traffic manager 360 may interpose between a set of buses for providing communication channels among components of server 300 including processor(s) 310, BMC 320, non-volatile memory 330, platform controller 340, adapter device 370, etc. Data traffic manager 360 can implement the aforementioned access policies on top of the bus protocol. For example, traffic manager 360 can receive, for a communication transaction, a set of request signals from a requester device (e.g., BMC 320) from a bus, and extract information (e.g., whether it is a read request or a write request, a target address for the request, data, etc.) represented by the set of request signals based on a protocol associated with the bus. Traffic manager 360 may forward the set of request signals to the target device if, based on the extracted information, traffic manager 360 determines that the request is allowed under the set of applicable access policies. Traffic manager 360 may also receive a set of response signals from the target device, and forward the response signals to the requester device. Traffic manager 360 can also transmit other protocol-specific signals to the requester device and to the target device based on the whether the set of request signals are forwarded, whether the response signals have been received, etc. For example, traffic manager 360 can transmit handshake signals to the requester device to indicate reception or rejection of the set of request signals according to the protocol. Traffic manager 360 can also transmit handshake signals to the target device to indicate termination of the communication transaction according to the protocol. With such arrangements, data traffic manager 360 can be seamlessly integrated with the server components without disrupting the normal operations of these components. For example, the server components need not operate a different protocol stack in order to interface with data traffic manager 360, which in turn substantially can simplify the design and operation of the secure execution environment.

Data traffic manager 360 may support a range of bus protocols including, for example, an $I^2C$ bus protocol. $I^2C$ provides master-slave synchronous communication between a master device and a slave device. Under a master-slave communication scheme, a master device can exert unidirectional control over the slave device, in which a master device can transmit a request via the bus to the slave device, but not vice versa. After receiving the request, the slave device can transmit a response (e.g., requested data, or other handshake signals) back to the master device.

Under the $I^2C$ protocol, a master device and a slave device can be connected by a bus comprising a clock line and a data line. The transmission of data bits on the data line is synchronized with the clock signals on the clock line. For a communication transaction, the master device may drive the clock line, and may take turn with the slave device in driving the data line. An $I^2C$ bus driver may be implemented with both an open-drain device and a pull-up resistor connected to a bus line (e.g., a clock line, a data line, etc.). When a device releases the bus line, the open-drain device can be disabled, and the pull-up resistor can pull the bus line to a first voltage level representing a logical one state. When the device drives the bus line, the open-drain device can be enabled to pull the bus line to a second voltage level. The second voltage level can be lower than the first voltage level, and can represent a logical zero state. The $I^2C$ protocol also supports a clock-stretching operation. During a clock-stretching operation, when the normal clock low period has expired, any device may hold down the clock line to delay the transmission of the next data bit. Clock-stretching allows the slave device to slow down the transaction, in a case where the slave device is unable to keep up with the master device. The master device can also hold down the clock line to delay the transmission of data by the slave device, in a case where the master device is unable to keep up with the slave device. The master device can also hold down the clock line to delay the transmission of data to the slave device, in a case where the master device requires additional time to prepare additional data.

Figure 4:
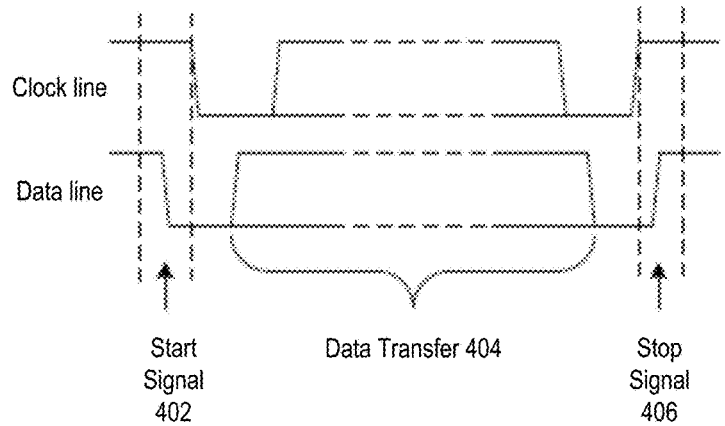
FIGS. 4-5 illustrate examples of bus protocols.
Figure 4:
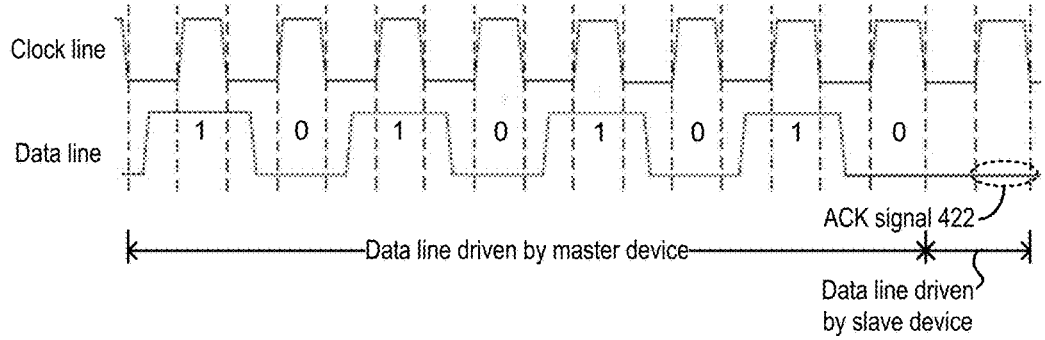
Figure 4:
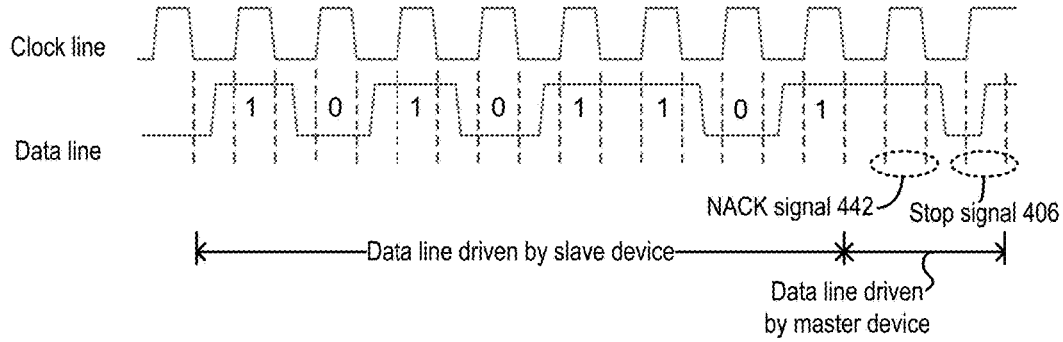

Under the $I^2C$ protocol, the master device and the slave device can also use specific patterns of signals on the clock line and the data line for handshaking. Reference is now made to FIG. 4, which illustrates examples of handshaking signaling of the $I^2C$ protocol. Diagram 400 illustrates a set of handshake signals transmitted by the master device to the slave device. As shown in FIG. 4, to initialize a communication transaction with a slave device, the master device can transmit a start signal 402. Data transfer 404 between the master device and the slave device can then take place once the slave device receives start signal 402. If, after data transfer 404 completes, the master device decides to terminate the communication transaction, the master device may transmit a stop signal 406 to the slave device to signal the termination of the communication transaction. Both start signal 402 and stop signal 406 can be represented by a combination of signals on the clock line and on the data line under the $I^2C$ protocol. For example, as shown in diagram 400, start signal 402 can be represented by a transition of the data line from a logical one state to a logical zero state when the clock line is at the logical one state. Stop signal 406 can be represented by a transition of the data line from the logical zero state to the logical one state when the clock line is at the logical one state. Moreover, during data transfer 404, data is sent one data bit (on the data line) for one clock cycle (on the clock line). The value of a data bit is based on the logical state of the data line when the clock line is at a logical one state within the clock cycle.

The master device and the slave device can also transmit handshake signals to each other during data transfer 404. One example of the handshake signals is an acknowledgment (ACK) signal, which can be transmitted by a master device to a slave device, or vice versa, to signal to a transmitter device that the transmitted data has been accepted by a recipient device. Diagram 420 illustrates an example of an ACK signal 422 transmitted by the slave device. In the example of diagram 420, after the master device transmits a pre-determined set of data bits (e.g., "10101010" in the example of diagram 420, based on the logical states of the data line during eight consecutive clock cycles on the clock line), the slave device may accept the data bits and transmit ACK signal 422 back to the master device. ACK signal 422 can also be represented by a combination of signals on the clock line and on the data line under the $I^2C$ protocol. For example, as shown in diagram 420, a slave device can transmit ACK signal 422 by setting the data line at the logical zero state, when the clock line is at the logical one state.

The master device and the slave device may also transmit other handshake signals during data transfer 404, such as a negative acknowledgement (NACK) signal. Either the master device or the slave device can transmit a NACK signal. A master device can transmit a NACK signal to indicate that it is done receiving data from the slave device, so that the slave device can stop sending data to the master device. A slave device may also transmit a NACK signal to a master device, to indicate that the slave device is not available to communicate with the master device, or that the slave device receives data or command from the master device that it does not understand. Diagram 440 illustrates an example of a NACK signal 442 transmitted by the master device. In the example of diagram 440, after the master device receives a pre-determined set of data bits (e.g., "10101101" in the example of diagram 440), the master device may transmit a NACK signal 442, followed by stop signal 406 to terminate the transaction.

Figure 5:
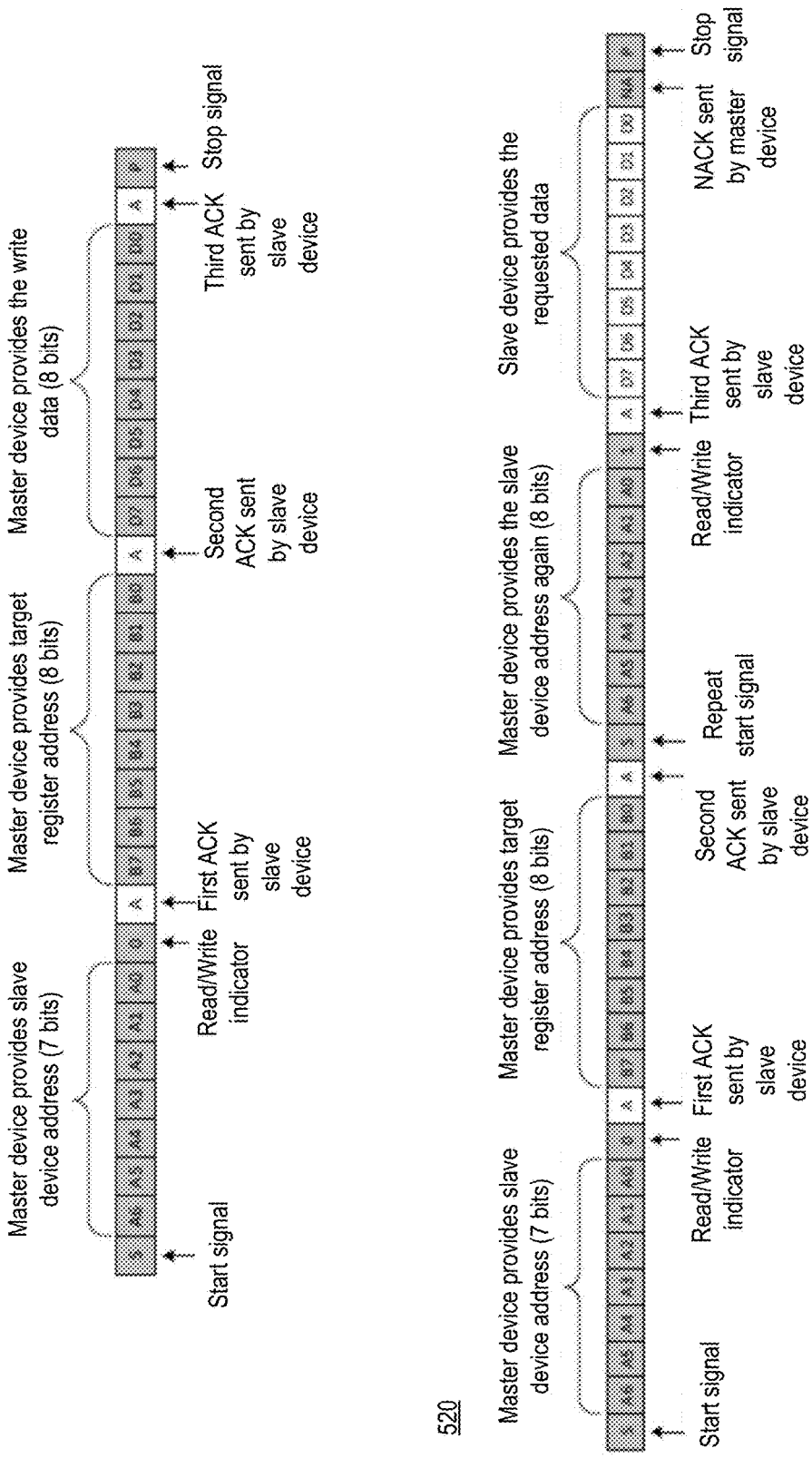

Under the I²C protocol, a communication transaction can be associated with a write access request, or can be associated with a read access request. A communication transaction can include a pre-determined sequence of signals transmitted by the master device and by the slave device, with the write access request having a different sequence from the read access request. FIG. 5 illustrates examples of signal sequences under the I²C protocol, in which diagram 500 illustrates an example of a write access request and diagram 520 illustrates an example of a read access request. Referring to diagram 500, to start a write access request, a master device can first transmit a start signal (e.g., start signal 406), followed by 7 bits of data representing an address of the target slave device for the write access request, and 1 bit at logical zero indicating a write request. If a receiver slave device is associated with a matching address, the receiver slave device may transmit a first ACK signal (e.g., ACK signal 422). After detecting the ACK signal from the slave device, the master device can transmit 8 bits of data representing a target register of the slave device to be updated with write data. If the receiver slave device has a matching register address, it can transmit a second ACK signal. After receiving the second ACK signal, the master device can transmit 8 bits of write data to be stored in the target register. The receiver slave device can transmit a third ACK signal. After receiving the third ACK signal, the master device can determine that the transaction for the write access request has been completed, and transmit a stop signal (e.g., stop signal 406) to the slave device to terminate the transaction.

Diagram 520 illustrates an example of a read access request. To start a read access request, a master device can transmit a start signal (e.g., start signal 406), followed by 7 bits of data representing an address of the target slave device for the write access request and 1 bit at logical zero indicating a write request. After receiving a first ACK signal from the receiver slave device, the master device can transmit 8 bits of data representing a target register of the slave device for the read access request (to provide read data). After receiving a second ACK signal from the receiver slave device, the master device can repeat the transmission of the start, followed by the 7-bit address of the target slave device, and 1 bit at logical one indicating a read request. After receiving the 7-bit address and the read request bit, the slave device may transmit a third ACK signal, followed by 8-bit data stored in the target register as the requested data, to the master device. If the master device is done receiving data from the slave device, it may transmit a NACK followed by a stop signal to the slave device to terminate the communication transaction.

As discussed above, data traffic manager 360 can implement a set of access policies on top of a communication protocol associated with the set of buses. Here, to support the I²C protocol, data traffic manager 360 can include a bus manager that interposes between a server component configured as a master device, and another server component configured as a slave device. The bus manager can interface with the master device by posing as a slave device. The bus manager can also interface with the slave device by posing as a master device. The bus manager can also process the signals received from the master device and from the slave device based on the I²C protocol. The bus manager also forwards the clock signals, including the stretched clock signals during the aforementioned clock-stretching operation. Moreover, referring to FIG. 4, the bus manager may monitor the signals on the clock line and the data line for a start signal (e.g., start signal 402) from the master device, to determine that a new communication transaction has been initiated by the master device. Also, referring to FIG. 5, after receiving the start signal, the bus manager may receive seven data bits representing a target device address from the master device, followed by one data bit representing read/write indicator. The bus manager can determine, based on the target device address and the set of access policies, whether to allow the master device access to the target device. If the master device is granted access, the bus manager can forward the target device address to the slave device. If the slave device can process the access request, it may transmit a first ACK back to the bus manager (e.g., as shown in diagrams 500 and 520), which can then forward the first ACK to the master device. The bus manager can then receive subsequent sets of data bits (e.g., target register address, slave device address (for read access request), read or write data, etc.), process the data bits based on the I²C protocol, determine whether or not to forward the data bits to the slave device based on the set of access policies, and forward the subsequent ACK signals received from the slave device to the master device, to complete the communication transaction.

On the other hand, if during any point of the communication transaction the bus manager determines not to grant access (e.g., based on a forbidden target device/register address, a forbidden write data pattern, etc.), or that the bus manager receive a NACK signal from the slave device, the bus manager may transmit (or forward) the NACK signal to the master device, and a stop signal to the slave device, to terminate the communication transaction.

Figure 6:
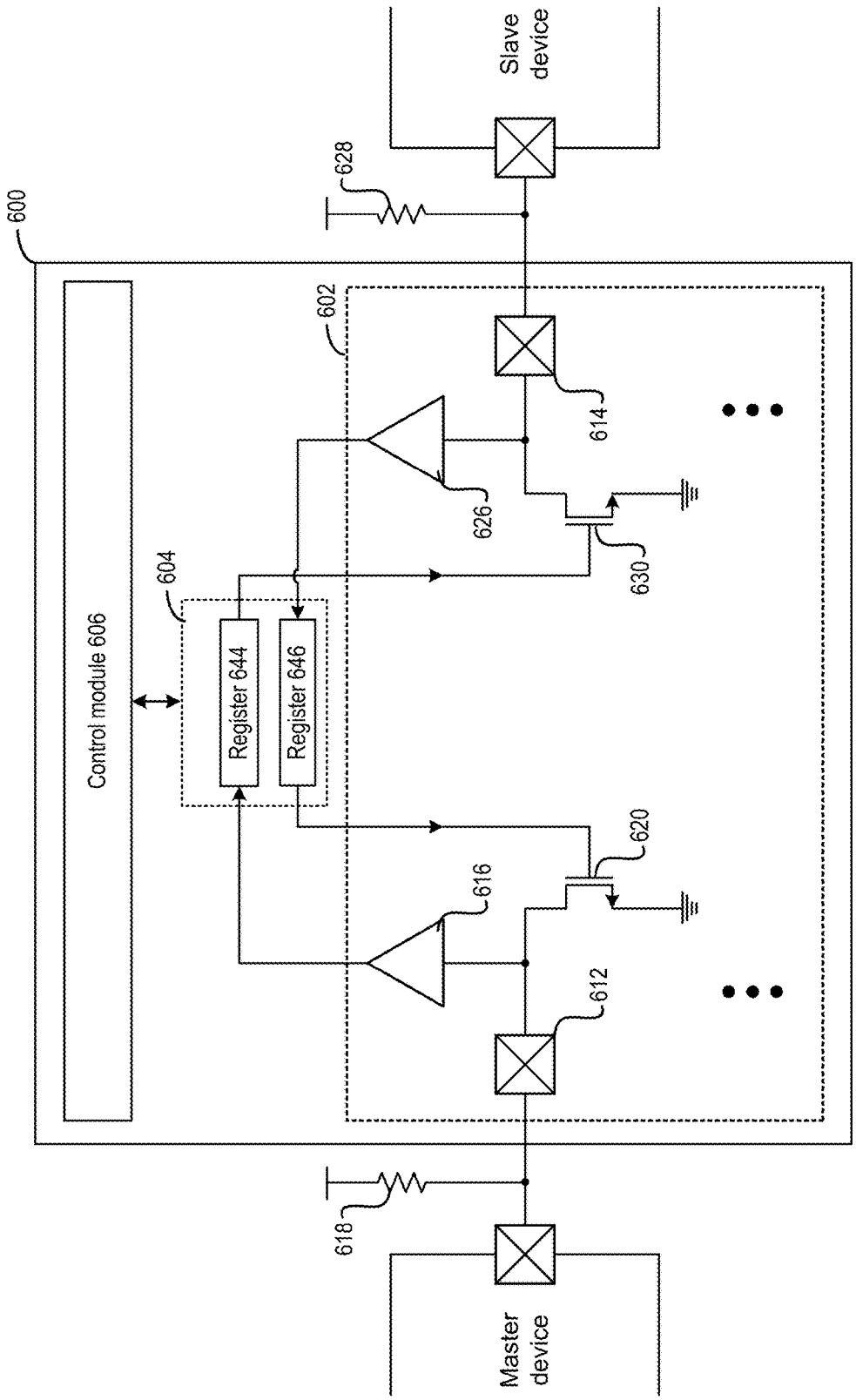
FIG. 6 is a simplified block diagram of a bus manager, according to certain aspects of the present disclosure.

Reference is now made to FIG. 6, which illustrates an example of a bus manager 600, according to aspects of the present disclosure. Bus manager 600 can include a bus interface circuit 602, a buffer 604, and a control module 606. Bus interface circuit 602 can include circuits for interfacing with I²C devices and operate based on the I²C protocol. For example, bus interface circuit 602 includes an upstream port 612 and downstream port 614. Upstream port 612 is to interface with a master I²C device, whereas downstream port 614 is to interface with a slave I²C device. Upstream port 612 and downstream port 614 may each be connected to a data line. Bus interface circuit 602 also includes another set of upstream port and downstream port for connection with a clock line, which are not shown in FIG. 6 for simplicity of illustration.

As shown in FIG. 6, upstream port 612 can be electrically connected with a receiver circuit 616, a pull-up resistor 618, and an open-drain driver 620. Receiver circuit 616 may include a comparator to determine the logical state (e.g., whether it represents a logical one or a logical zero) of a signal received (from the master device) at upstream port 612. Pull-up resistor 618 and open-drain driver 620 may form a transmitter circuit to transmit a signal (to the master device) at upstream port 612. For example, when open-drain driver 620 is enabled, upstream port 612 can be pulled down to a first voltage, whereas when open-drain driver 620 is disabled, upstream port 612 can be pulled up to a second voltage by pull-up resistor 618. Downstream port 614 are also electrically connected with a receiver circuit 626, a pull-up resistor 628, and an open-drain driver 630 with similar functionality as, respectively, receiver circuit 616, pull-up resistor 618, and open-drain driver 620. Both pull-up resistors 618 and 628 can be directly connected between, respectively, upstream port 612 and downstream port 614 on the motherboard of the server that includes bus manager 600. Both pull-up resistors 618 and 628 can be connected to a power supply that sets the voltage level of logical one.

Bus manager 600 further includes buffer 604 and control module 606. Buffer 604 includes a set of registers 644 and 646 to buffer and/or modify signals transmitted between upstream port 612 and downstream port 614. For example, register 644 can buffer and/or modify a signal transmitted from upstream port 612 to downstream port 614. Register 644 can receive the signal via receiver circuit 616. Based on a decision from control module 606, register 644 can either forward the signal, or transmit a different signal, to open-drain driver 620 for transmission to downstream port 614. Register 646 can also buffer and/or modify a signal transmitted from downstream port 614 to upstream port 612 based on decision from control module 606. The registers can add a pre-determined delay in the sequential timing of the signals between upstream port 612 and downstream port 614, with the delay configured to provide sufficient processing time for control module 606 to make a decision on what signal to forward to the downstream port (by register 644) or to the upstream port (by register 646). As an example, register 644 can include a depth of one data bit, to add a delay of one clock cycle in the sequential timing of the signals between upstream port 612 and downstream port 614. The decision of whether to forward a signal received from upstream port 612 to downstream port 614 can occur within the one-clock delay. As an illustrative example, when register 644 receives the eighth data bit of the write data from the master device, register 644 has just transmitted the seventh data bit of the write data to the slave device. During the one clock cycle time, control module 606 can determine whether the eight data bits of the write data are associated with a black-listed communication transaction. If control module 606 determines that the write data are associated with a black-listed communication transaction, it may overwrite the signal stored in register 644 with a stop signal, so that in the next clock cycle, open-drain driver 620 can transmit the stop signal to downstream port 614 in lieu of the eight data bit of the write data. With such arrangement, the slave device can be prevented from receiving the entirety of the blacklisted write data and will not be compromised. Register 646 can also be updated by control module 606 to transmit a NACK signal back to the master device.

Figure 7:
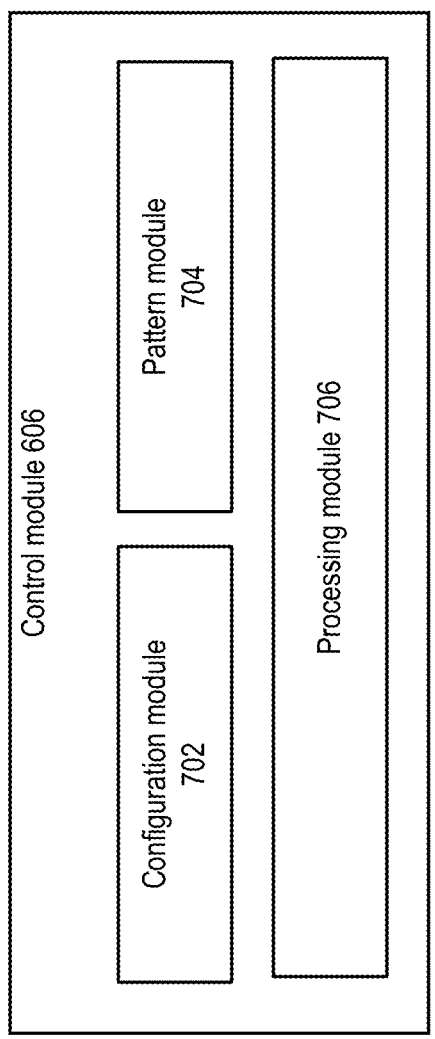
FIG. 7 is a simplified block diagram of a component of the bus manager of FIG. 6, according to certain aspects of the present disclosure.

Control module 606 may generate a decision for forwarding a signal between upstream port 612 and downstream port 614, and control registers 644 and 646 accordingly. Control module 606 may be configured to generate the decision based on a set of access policies. The set of access policies may vary between different master and slave I²C devices. The policies may also change at different times, as discussed above. FIG. 7 illustrates an example of components of control module 606, according to certain aspects of the present disclosure. As shown in FIG. 7, control module 606 may include a configuration module 702, a pattern module 704, and a processing module 706.

Configuration module 702 can set an operation mode under which processing module 706 operates. Together with pattern module 704, configuration module 702 can determine an access policy granted to the master device, to be implemented by procession module 706. Control module 606 may be configured, by configuration module 702, to operate under different operating modes (e.g., one of the filtering mode, the pass-through mode, or the disabled mode) based on a configuration. The configuration may include external instructions (e.g., from processor(s) 310, platform controller 340, adapter device 370, etc.). Moreover, the configuration can also vary for different server components and for different stages of operation of the server. Using the examples described above, when the server is in the power-up stage, a bus manager 600 that controls access of a trusted device (e.g., processor(s) 310, adapter device 370, etc.) to non-volatile memory 330 may be configured to operate under the filtering mode to allow the trusted device restricted access to certain region of non-volatile memory 330 for reading and/or updating the firmware. On the other hand, a bus manager 600 that control access of other devices to non-volatile memory 330 may operate under the disabled mode to prevent these components from accessing the memory in the power-up stage. On the other hand, after the server has started up and in normal operation, bus manger 600 may allow the trusted devices unrestricted access to part of non-volatile memory 330 that stores client data, by operating under the pass-through mode.

Pattern module 704 can provide a set of black-listed data bit patterns, which can be detected from upstream port 612 and blocked from forwarding to downstream port 614 by processing module 706. The black-listed data bit patterns may include an address such as, for example, a target device address, a target register address, etc. The black-listed data bit pattern can also include data bits for a black-listed transaction, such as an access request to write specific data to a specific target device and register. For example, referring back to FIG. 5, the black-listed data bit pattern can also include a specific sequence of data bits including a 7-bit target device address, one data bit for read/write indicator, an 8-bit register address, and 8-bit write data. Different data bit patterns can be stored for different combinations of target device addresses, register addresses, and write data. The data bit patterns can also vary based on operation modes, such that a device and/or a register that is blacklisted under one operation mode (e.g., filtering mode) is not blacklisted under another operation mode (e.g., disabled mode). Referring to the example above, an address associated with client data storage at non-volatile memory 330 may be blacklisted during the disabled mode (e.g., when the server is in the power-up stage), but not blacklisted during the filtering mode (e.g., when the server is in normal operation). On the other hand, write access requests associated with certain communication transactions can be blacklisted based on sequences of data bits comprising target device addresses, register addresses, and write data.

Processing module 706 can monitor a sequence of signals/data bits from register 644 of buffer 604, interpret the signals/data bits based on the I²C protocol, and handle the selective forwarding of the signals to downstream port 614 based on the operation mode set by configuration module 702 and pattern module 704. For example, processing module 706 can be synchronized with the clock signal that clocks register 644, and reads an output from register 644 once for each cycle of the clock signal. From the output, processing module 706 can detect the occurrence of a start signal. After detection of the start signal, processing module 706 can read seven consecutive data bits output by register 644 (in seven consecutive clock cycles) to obtain the target slave device address, followed by the one data bit output corresponding to the read/write indicator, all of which were provided by the master device. Processing module 706 can process the target slave device address differently under different modes. For example, in the disabled mode, processing module 706 may transmit a stop signal (via register 644) to downstream port 614, and a NACK signal (via register 646) to upstream port 612, whenever processing module 706 detects a data bit sent from the master device, without waiting to receive the complete seven-bit address data from register 644.

On the other hand, in both the pass-through mode and the filtering mode, processing module 706 may collect seven data bits representing a target slave device address, and eight data bits representing a target register device. Processing module 706 may determine whether the target slave device address and target register address are valid based on, for example, a whitelist of addresses provided by pattern module 704. If any of the addresses is invalid, processing module 706 may also transmit a stop signal (via register 644) to downstream port 614, and a NACK signal (via register 646) to upstream port 612. On the other hand, if they match, processing module 706 may allow register 644 to carry on with transmitting the address data bits to downstream port 614. Processing module 706 may also determine whether an ACK is received from the slave device after the address data bits are transmitted, from register 646. If no ACK is detected (or a NACK signal is detected), processing module 706 may also transmit the stop signal (via register 644) to downstream port 614, and the NACK signal (via register 646) to upstream port 612.

During the filtering mode, processing module 706 can also keep a log of a sequence of data bits based on identifying that the data bits corresponds to a write request (e.g., based on the read/write indicator data bit). The sequence of data bits may include a target slave device address, a target register address, and eight bits of write data. and compare the sequence of data bits against a pattern of data bits associated with blacklisted transactions (e.g., write request directed to a particular register address, writing specific data pattern, etc.) provided by pattern module 704. The comparison can be completed before register 644 transmits the last data bit of the eight-bit write data. If a matching pattern is found, control module 606 can update the data bit stored in register 644 to transmit a stop signal in lieu of the last data bit of write data to downstream port 614.

In some embodiments, bus manager 600 can also allow multiple master devices to connect to a single slave device, and can act as an arbitrator. For example, if, during a communication transaction between one of the master devices and the slave device, another master device transmits a start signal to initiate another communication transaction with the slave device, bus manager 600 can transmit a NACK signal back to that master device (e.g., via a register coupled with an upstream port connected to a data line of that master device). Bus manager 600 can also transmit a stretched clock signal (e.g., by holding down the upstream port connected to a clock line of that master device), until the on-going communication transaction completes.

Figure 8:
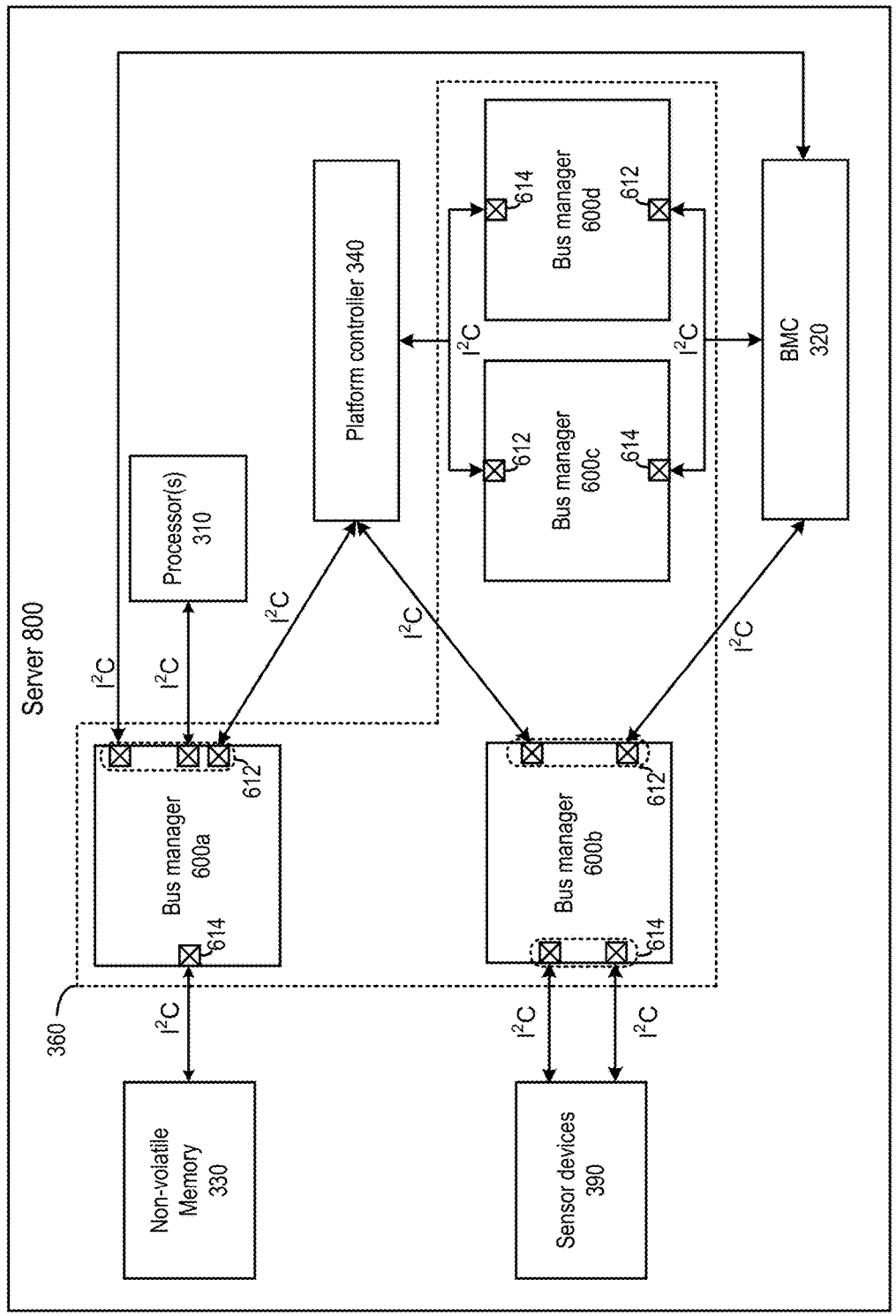
FIG. 8 illustrates an example server comprising instances of the bus manager of FIG. 6, according to certain aspects of the present disclosure.

FIG. 8 is a simplified block diagram of an example server 800 configured to host bare-metal instances, according to certain aspects of the present disclosure. Server 800 may include some or all of the components of server 300 illustrated in FIG. 3. One skilled in the relevant art will appreciate that the disclosed illustrative components are not meant to be an exhaustive identification of all the components required by or present in a server. Rather, illustrative components have been identified, in a non-limiting manner, to facilitate illustration of one or more aspects of the present application. Still further, the illustrative components of server 800 may be logical in nature such that the physical implementation of one or more components can be varied or such that one or more of the logical components may be implemented in a virtualized manner.

As server 300 of FIG. 3, server 800 may include processor(s) 310, BMC 320, non-volatile memory 330, platform controller 340, data traffic manager 360, and sensor devices 375 (of adapter device 370, not shown in FIG. 8). Data traffic manager 360 can include multiple instances of bus managers 600 of FIG. 6, for controlling I²C data traffic between the rest of the components of server 800. For example, bus manager 600a may interpose between non-volatile memory 330 and a number of components including, for example, processor(s) 310, BMC 320, and platform controller 340. Non-volatile memory 330 can be configured as a slave device and is coupled with downstream port 614 of bus manager 600a, whereas processor(s) 310, BMC 320, and platform controller 340 are configured as master devices (relative to non-volatile memory 330) and are coupled with upstream ports 612 of bus manager 600a.

Further, bus manager 600b may interpose between sensor devices 390 and platform controller 340 and BMC 320. Sensor devices 390 may be configured as slave devices and coupled with downstream port(s) 614 of bus manager 600b, whereas platform controller 340 and BMC 320 may be configured as master devices (relative to sensor devices 390) and are coupled with upstream ports 612 of bus manager 600b.

Moreover, bus managers 600c and 600d may each interpose between BMC 320 and platform controller 340. In the example of FIG. 8, platform controller 340 may be connected to a first set of I²C signals, and the first set of I²C signals can also be connected to both upstream port 612 of bus manager 600c and downstream port 614 of bus manager 600d. Moreover, BMC 320 may be connected a second set of I²C signals, and the second set of I²C signals can also be connected to both upstream port 612 of bus manager 600d and downstream port 614 of bus manager 600c. Bus manager 600c may support communication transactions in which BMC 320 acts as a slave device and platform controller 340 acts as a master device (e.g., in a case where platform controller 340 implements a hardware-based management function and sends instructions to BMC 320 to reset the server), with platform controller 340 coupled with upstream port 612 and BMC 320 coupled with downstream port 614 of bus manager 600c. Further, bus manager 600d may support communication transactions in which BMC 320 acts as a master device and platform controller 340 acts a slave device (e.g., in a case where BMC 320 requests operation data related to the peripherals managed by platform controller 340 for transmission to processor(s) 310), with BMC 320 coupled with upstream port 612 and platform controller 340 coupled with downstream port 614 of bus manager 600d.

Although not shown in FIG. 8, it is understood that server 800 may include additional bus managers 600. For example, a bus manager 600 can interpose between, for example, adapter device 370 configured as a master device and sensor devices 390 configured as slave devices, to enable adapter device 370 (not shown in FIG. 8) to access sensor devices

390. Another bus manager 600 can interpose between, for example processor(s) 310, BMC 320, and platform controller 340 configured as master devices, and adapter device 370 configured as a slave device, to enable the master devices to access the memory, debug registers, etc. of the adapter device 370.

Each of bus managers 600a-600d may be configured to operate at different operation modes and to filter out different patterns of access requests, and for different master and slave devices. For example, bus manager 600a may operate under the filtering mode between processor(s) 310 (and/or adapter device 370) and non-volatile memory 330 during the power-up stage of server 800 for memory regions that store the firmware. During the power-up stage, bus manager 600a may also operate under the disabled mode for all other devices (e.g., BMC 320, platform controller 340, etc.). During normal operation stage, bus manager 600a may operate under filtering mode for, for example, BMC 320, to allow BMC 320 to access specific regions of non-volatile memory 330 but not regions that store client data. Moreover, bus manager 600b may perform under the pass-through mode to allow platform controller 340 and BMC 320 unrestricted access to sensor devices 375. Further, bus manager 600c may also operate under the pass-through mode to allow platform controller 340 unrestricted access to BMC 320, whereas bus manager 600d may operate under the filtering mode to allow BMC 320 (which may be untrusted) restricted access to certain registers of platform controller 340 that stores sensor data, but not other resources provided by platform controller 340. The differences in the access policies can be set by different configurations in configuration module 702, as well as different address and transaction data patterns in pattern module 704, of bus managers 600a-600d.

Figure 9A:
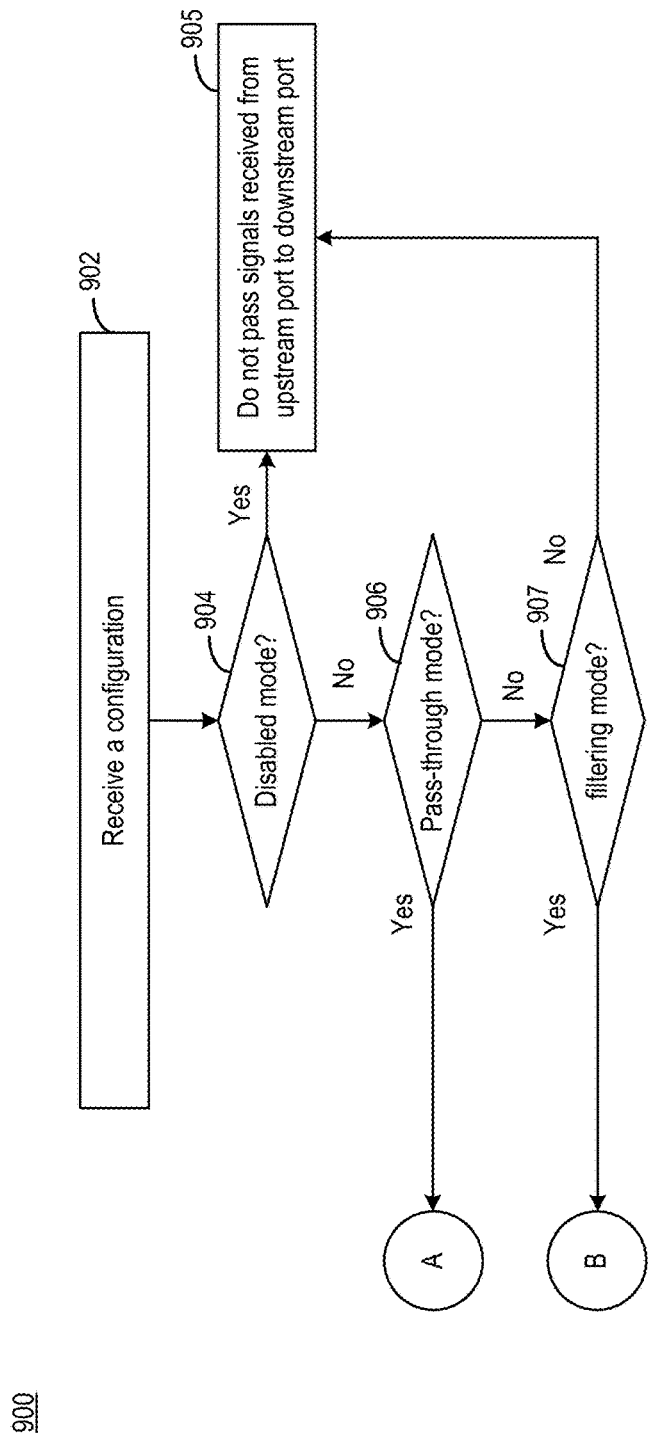
FIGS. 9A-9C illustrate an example flow diagram of a process for securing a server in a compute service system, according to certain aspects of the present disclosure.
Figure 9B:
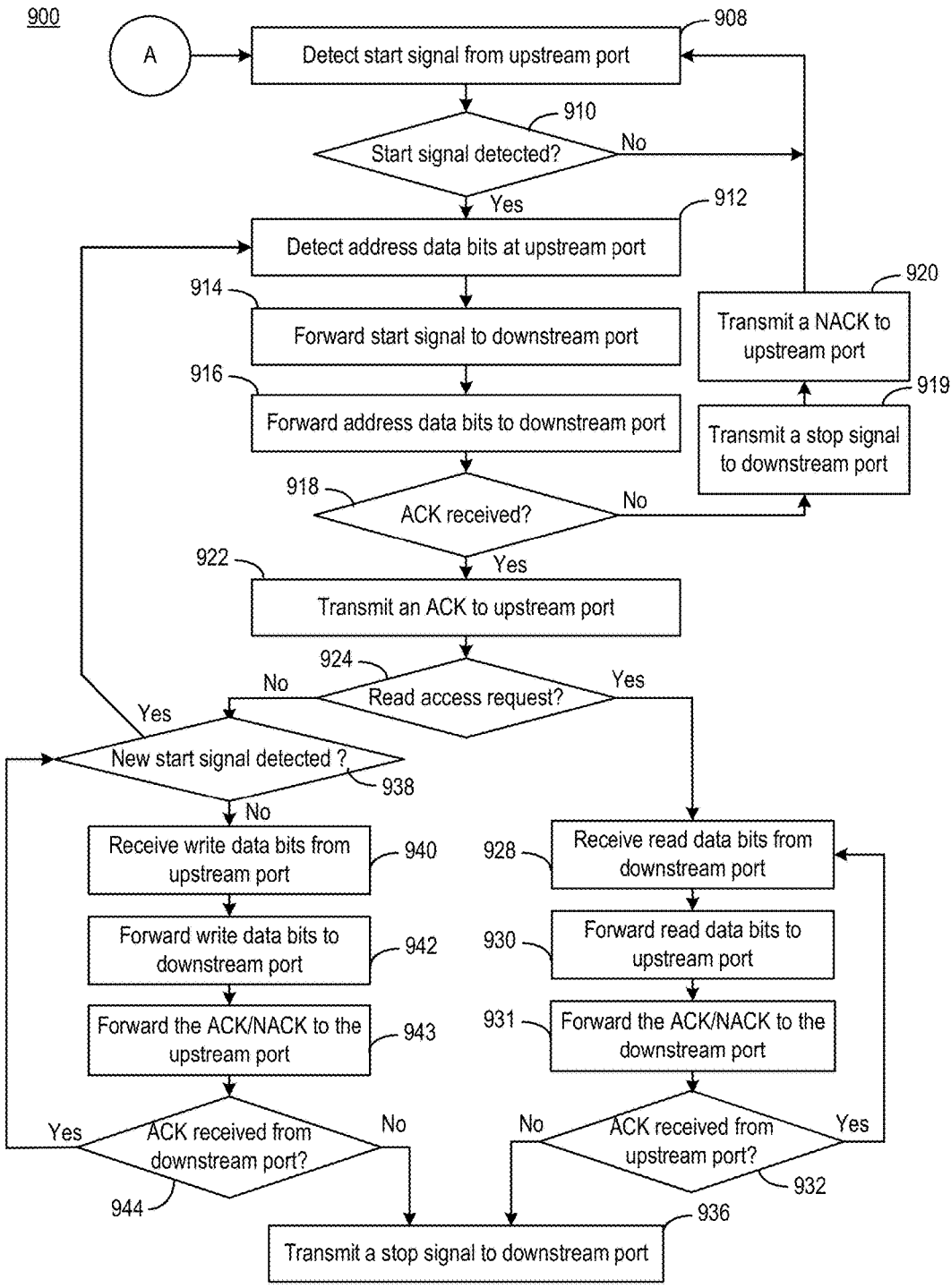
Figure 9C:
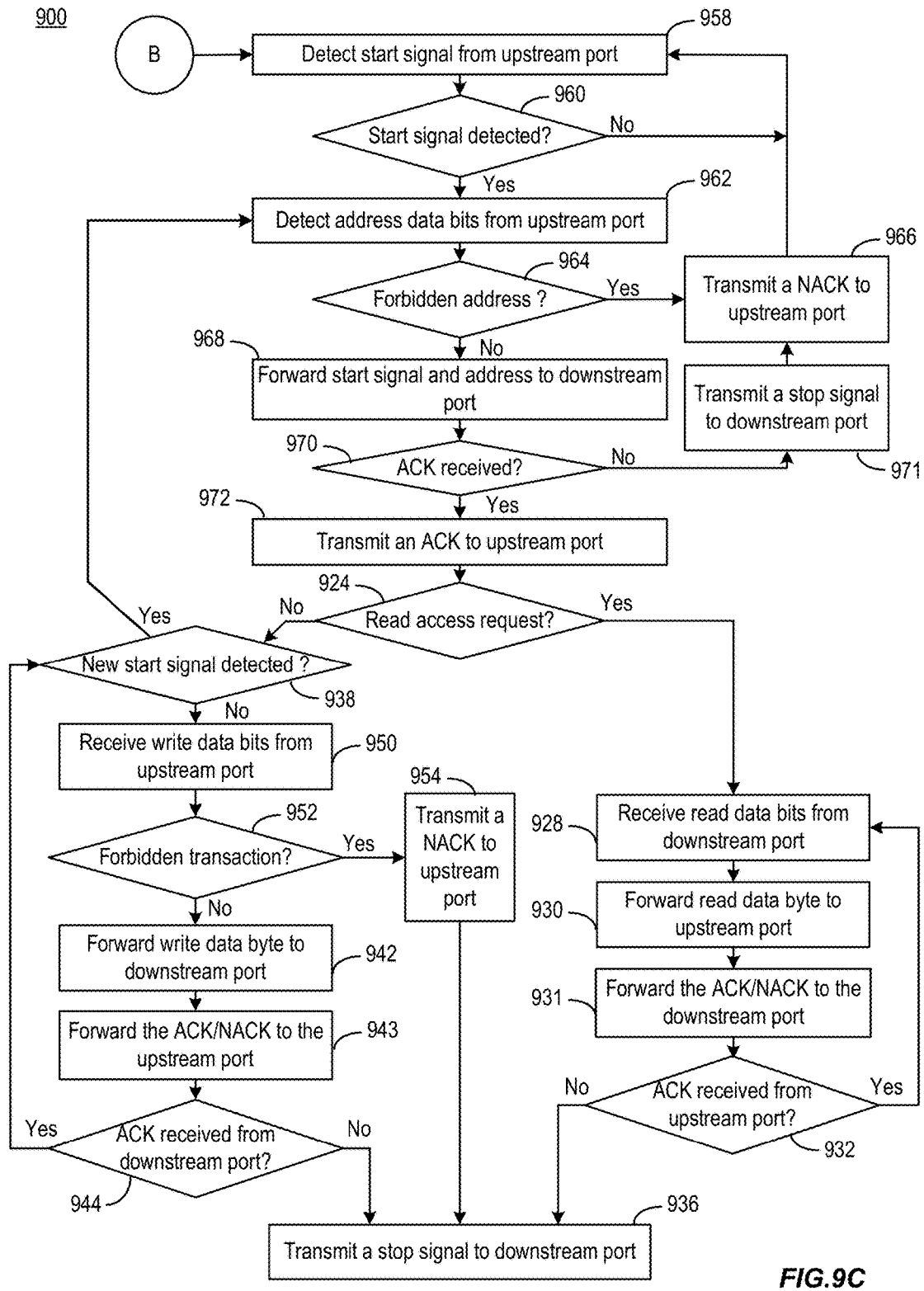

FIG. 9A-9C illustrate an example flow diagram of a process 900 for securing a server, according to certain aspects of the present disclosure. The process may be implemented by various systems described above, such as, for example, bus manager 600 of FIG. 6.

Referring to FIG. 9A, at operation 902, the system receives a configuration setting. The configuration setting can set the system to operate in one of three operating modes: a disabled mode, a pass-through mode, or a filtering mode. If the system is configured to operate in the disabled mode (at operation 904), the system may determine not to pass any signals received from an upstream port (e.g., upstream port 612) to a downstream port (e.g., downstream port 614) at operation 905.

Referring to FIG. 9B, if the system is configured to operate in the pass-through mode (at operation 906), the system may detect a start signal (e.g., start signal 402 of FIG. 4) from the upstream port to initiate a communication transaction, at operation 908. If a start signal is not detected (at operation 910), the system may proceed back to operation 908 to monitor for the start signal. On the other hand, if a start signal is detected (at operation 910), the system may proceed to detect address data bits from the upstream port, at operation 912. The system may read seven consecutive data bits to obtain a target device address and one data bit to detect a read or write request. The system may forward a start signal to downstream port, at operation 914. The forwarding of the start signal can occur after the system detects the first address data bit at the upstream port, or after the system receives eight consecutive data bits at the upstream ports. The system may also forward the address data bits to downstream port, at operation 916. The system may forward an address data bit to the downstream port each time it receives the data bit, or may accumulate the eight consecutive data bits and then forward the eight data bits.

After forwarding the address data bits to the slave device via the downstream port, the system can then determine whether an ACK is received from the slave device at the downstream port, at operation 918. If no ACK has been received from the slave device (e.g., due to invalid address being forwarded at operation 916), the system may transmit a stop signal (e.g., stop signal 406) to downstream port at operation 919. The system may also transmit a NACK to the upstream port, at operation 920.

On the other hand, if an ACK is received from the slave device, the system can forward the ACK to the upstream port, at operation 922. After transmitting the ACK (at operation 922), the system can determine whether the received address data bits are associated with a read access request or a write access request, at operation 924. The determination can be based on whether a data bit pattern for read access request was received at operation 912. The read access request may be indicated by a logic one received in the read/write indicator bit that followed the 7-bit target device address received at operation 912. In the case of a read access request, the system can also receive read data bits (e.g., eight bits of data) from the downstream port (at operation 928), and forward the received read data bits to the upstream port, at operation 930. As described above, the system may include a single-bit register (e.g., register 644) to receive one data bit from the upstream port in one clock cycle, and transmit the received data bit to the downstream port in the next clock cycle, so that only one clock-cycle delay is introduced between the upstream port and the downstream port. After the system transmits a pre-determined number of data bits (e.g., eight data bits), the system can then forward an ACK or a NACK received from the upstream port to the downstream port, at operation 931. If an ACK has been received (at operation 932), the system can proceed back to operation 928 to receive other read data from the slave device. On the other hand, if no ACK has been received, or a NACK has been received at the upstream port (at operation 932), the system may transmit the stop signal (e.g., stop signal 406) to the downstream port, to terminate the communication transaction, at operation 936.

On the other hand, if the system determines that a write access request is being processed based on, for example, a logic zero received in the read/write indicator bit that followed the 7-bit target device address (at operation 912), the system may proceed to determine whether a new start signal is detected at the upstream port (at operation 938). The new start signal can be a repeat start signal transmitted by the master device. During the processing of a write access request, the master device may initiate a read access request. For example, in a case where the write access request is to configure a register offset or memory address within the slave device from which to read data, the master device may initiate the transition from write access request to read access request by transmitting a repeated start signal, which can be detected at operation 941. If the new start signal is detected at operation 941, the system can proceed back to operation 912 to receive the address data bits for the read access request.

On the other hand, if new start signal is not detected at operation 938, the system may proceed to receive write data bits from the upstream port, at operation 940. The system can forward the write data bits to the downstream port, at operation 942. The system can then forward an ACK or a NACK received from the downstream port to the upstream port, at operation 943. If an ACK was received (at operation 944), the system may proceed back to operation 938 to determine whether a new start signal is detected at the upstream port, which indicates a transition to processing a read access request as discussed above. If no new start signal is detected (at operation 938), the system may proceed back to operation 940 to receive other write data from the master device. On the other hand, referring back to operation 944, if no ACK has been received, or a NACK has been received at the downstream port, the system may forward the NACK to the upstream port. The system may also transmit a stop signal to the downstream port to terminate the communication transaction, at operation 936.

Referring to FIG. 9C, if the system is configured to operate in the filtering mode (at operation 907 of FIG. 9A), the system may detect a start signal (e.g., start signal 402 of FIG. 4) from the upstream port to initiate a communication transaction, at operation 958. If a start signal is not detected (at operation 960), the system may proceed back to operation 958 to monitor for the start signal. On the other hand, if a start signal is detected (at operation 960), the system may proceed to detect address data bits from the upstream port, at operation 962. After accumulating eight consecutive data bits representing the 7-bit target device address and the read/write request indicator bit, the system may proceed to operation 964 to determine whether a forbidden address has been detected. The forbidden address can be associated with the blacklist of forbidden transactions (e.g., reading from or writing to a particular memory region or other slave devices that is inaccessible by the master device). The forbidden address can be detected by checking against a pattern of forbidden addresses. If a forbidden address is detected (in operation 964), the system may proceed to transmit a NACK signal to the upstream port, at operation 966. On the other hand, if the forbidden address is not detected (e.g., because the system has not yet received the eight data bits, the eight data bits are not associated with a forbidden address, etc.) at operation 964, the system may forward the start signal and the address data bits to the downstream port, at operation 968.

After forwarding the address data bits to the slave device via the downstream port, the system can then determine whether an ACK is received from the slave device at the downstream port, at operation 970. If no ACK has been received from the slave device (e.g., due to invalid (but not forbidden) address being forwarded at operation 968), the system may transmit a stop signal (e.g., stop signal 406) to the downstream port at operation 971, and transmit a NACK to the upstream port, at operation 966.

On the other hand, if an ACK is received from the slave device, the system can forward the ACK to the upstream port, at operation 972. After transmitting the ACK (at operation 972), the system can repeat operations 924 to 936 as described with respect to FIG. 9B, including the processing of read access request. If a write access request is detected at operation 924 (e.g., based on the read/write indicator bit received at operation 962), the system may proceed to operation 938 to determine whether a new start signal (e.g., a repeat start signal) is received at the upstream port (from the master device), which signals a transition to processing a read access request as described above. If the new start signal is detected at operation 938, the system may proceed back to operation 962 to detect address data bits for the read access request. On the other hand, if no new start signal is detected at operation 938, the system may proceed to operation 950 to receive and accumulate write data bits from the upstream port. After a pre-determined number of data bits (e.g., eight bits) have been accumulated, the system can determine whether the write data belongs to a forbidden transaction, at operation 952. The determination can be based on a blacklist of forbidden transactions provided by pattern module 704, as described above. If the write data belongs to a forbidden transaction (at operation 952), the system may proceed to operation 954 to transmit a NACK to the upstream port (at operation 954), followed by a stop signal to the downstream port to terminate the communication transaction, at operation 936. On the other hand, if the system determines that the write data is not associated with a forbidden transaction (at operation 952), the system may proceed to operations 942-944 and/or operations 936 and 938 as described above with respect to FIG. 9B.

It is noted that even though FIGS. 9A-9C describes an example process as sequential operations, some of the operations may be performed in parallel or concurrently. An operation may have additional steps not included in the figure. Some operations may be optional, and thus may be omitted in various embodiments. Some operations may be performed together with other operations. Furthermore, embodiments of the methods may be implemented in hardware, software, firmware, middleware, microcode, hardware description languages, or any combination thereof.

Computing Systems

Figure 10:
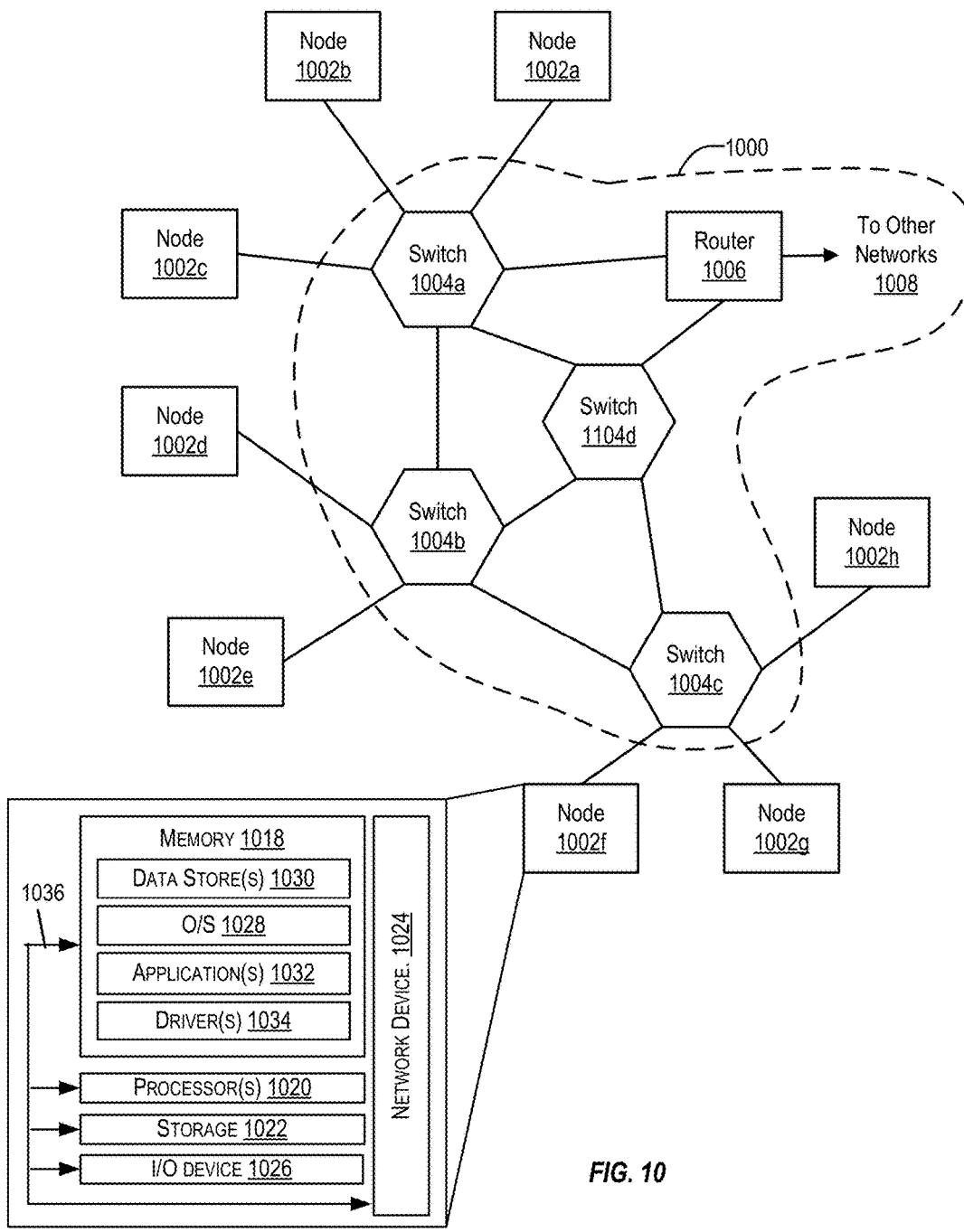
FIG. 10 illustrates an example architecture for features and systems described herein that includes one or more service provider computers and/or a user device connected via one or more networks, according to certain aspects of the disclosure.

FIG. 10 illustrates a network 1000, illustrating various different types of network devices, such as nodes comprising the network device, switches and routers. In certain embodiments, the network 1000 may be based on a switched architecture with point-to-point links. As illustrated in FIG. 11, the network 1000 includes a plurality of switches 1004a-1004d, which may be arranged in a network. In some cases, the switches are arranged in a multi-layered network, such as a Clos network. A network device that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 1004a-1004d may be connected to a plurality of nodes 1002a-1002h and provide multiple paths between any two nodes.

The network 1000 may also include one or more network devices for connection with other networks 1008, such as other subnets, LANs, wide area networks (WANs), or the Internet, and may be referred to as routers 1006. Routers use headers and forwarding tables to determine the best path for forwarding the packets, and use protocols such as internet control message protocol (ICMP) to communicate with each other and configure the best route between any two devices.

In some examples, network(s) 1000 may include any one or a combination of many different types of networks, such as cable networks, the Internet, wireless networks, cellular networks and other private and/or public networks. Interconnected switches 1004a-1004d and router 1006, if present, may be referred to as a switch fabric, a fabric, a network fabric, or simply a network. In the context of a computer network, terms "fabric" and "network" may be used interchangeably herein.

Nodes 1002a-1002h may be any combination of host systems, processor nodes, storage subsystems, and I/O chassis that represent user devices, service provider computers or third party computers.

User devices may include computing devices to access an application 1032 (e.g., a web browser or mobile device application). In some aspects, the application 1032 may be hosted, managed, and/or provided by a computing resources service or service provider. The application 1032 may allow the user(s) to interact with the service provider computer(s)

to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 1008. Additionally, the user device(s) may be part of the distributed system managed by, controlled by, or otherwise part of the service provider computer(s) (e.g., a console device integrated with the service provider computers). One example of application 1032 can include, for example, software instructions corresponding to control module 606 of FIGS. 6 and 7.

The node(s) of FIG. 10 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 1032 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 1002a-1002h may include at least one memory 1018 and one or more processing units (or processor(s) 1020). The processor(s) 1020 may be implemented in hardware, computer-executable instructions, firmware, or combinations thereof. Computer-executable instruction or firmware implementations of the processor(s) 1020 may include computer-executable or machine-executable instructions written in any suitable programming language to perform the various functions described.

In some instances, the hardware processor(s) 1020 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 1018 may store program instructions that are loadable and executable on the processor(s) 1020, as well as data generated during the execution of these programs. Depending on the configuration and type of the node(s) 1002a-1002h, the memory 1018 may be volatile (such as RAM) and/or non-volatile (such as ROM, flash memory, etc.). The memory 1018 may include an operating system 1028, one or more data stores 1030, one or more application programs 1032, one or more drivers 1034, and/or services for implementing the features disclosed herein.

The operating system 1028 may support nodes 1002a-1002h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 1028 may also be a proprietary operating system.

The data stores 1030 may include permanent or transitory data used and/or operated on by the operating system 1028, application programs 1032, or drivers 1034. Examples of such data include web pages, video data, audio data, images, user data, and so on. The information in the data stores 1030 may, in some implementations, be provided over the network(s) 1008 to user devices 1004. In some cases, the data stores 1030 may additionally or alternatively include stored application programs and/or drivers. Alternatively or additionally, the data stores 1030 may store standard and/or proprietary software libraries, and/or standard and/or proprietary application user interface (API) libraries. Information stored in the data stores 1130 may be machine-readable object code, source code, interpreted code, or intermediate code.

The drivers 1034 include programs that may provide communication between components in a node. For example, some drivers 1034 may provide communication between the operating system 1028 and additional storage 1022, network device 1024, and/or I/O device 1026. Alternatively or additionally, some drivers 1034 may provide communication between application programs 1032 and the operating system 1028, and/or application programs 1032 and peripheral devices accessible to the service provider computer. In many cases, the drivers 1134 may include drivers that provide well-understood functionality (e.g., printer drivers, display drivers, hard disk drivers, Solid State Device drivers). In other cases, the drivers 1034 may provide proprietary or specialized functionality.

The service provider computer(s) or servers may also include additional storage 1022, which may include removable storage and/or non-removable storage. The additional storage 1022 may include magnetic storage, optical disks, solid state disks, flash memory, and/or tape storage. The additional storage 1022 may be housed in the same chassis as the node(s) 1002a-1002h or may be in an external enclosure. The memory 1018 and/or additional storage 1022 and their associated computer-readable media may provide non-volatile storage of computer-readable instructions, data structures, program modules, and other data for the computing devices. In some implementations, the memory 1018 may include multiple different types of memory, such as SRAM, DRAM, or ROM.

The memory 1018 and the additional storage 1022, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 1018 and the additional storage 1022 are examples of computer storage media. Additional types of computer storage media that may be present in the node(s) 1002a-1002h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 1002a-1002h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 1002a-1002h may also include I/O device(s) 1026, such as a keyboard, a mouse, a pen, a voice input device, a touch input device, a display, speakers, a printer, and the like. The node(s) 1002a-1002h may also include one or more communication channels 1036. A communication channel 1036 may provide a medium over which the various components of the node(s) 1002a-1002h can communicate. The communication channel or channels 1036 may take the form of a bus, a ring, a switching fabric, or a network.

The node(s) 1002a-1002h may also contain network device(s) 1024 that allow the node(s) 1002a-1002h to communicate with a stored database, another computing device or server, user terminals and/or other devices on the network(s) 1000. The network device(s) 1024 of FIG. 10 may include similar components discussed with reference to, for example, adapter device 270 of FIG. 2.

In some implementations, the network device 1024 is a peripheral device, such as a PCI-based device. In these implementations, the network device 1024 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, network device 1024 may be connected to a computing system using a PCIe interface for implementing NVMe.

A PCI-based device may include one or more functions. A "function" describes operations that may be provided by the network device 1024. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 1024 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 10, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A server comprising:
   a set of bus pairs, each of the set of bus pairs comprising a data line and a clock line;
   a processor coupled with a first pair of the set of bus pairs;
   a baseboard management controller (BMC) coupled with a second pair of the set of bus pairs;
   a platform controller coupled with a third pair of the set of bus pairs;
   a non-volatile memory coupled with a fourth pair of the set of bus pairs;
   a sensor device configured coupled with a fifth pair of the set of bus pairs; and
   a data traffic manager comprising a set of upstream port pairs and a set of downstream port pairs, the set of upstream port pairs being coupled with the first, second, and third pairs of the set of bus pairs, the set of downstream port pairs being coupled with the fourth and fifth pairs of the set of bus pairs;
   wherein the data traffic manager is configured to operate in a disabled mode, a filtering mode, or a pass-through mode;
   wherein in the disabled mode, the data traffic manager is configured to block transmission of any signals from one of the set of upstream port pairs to one of the set of downstream port pairs;
   wherein in the filtering mode, the data traffic manager is configured to:
      receive a first write request from a first upstream port of the set of upstream port pairs, the first write request being targeted at a first downstream port of the set of downstream port pairs; and
      block the first write request from reaching the first downstream port based on a determination that the first write request is associated with a forbidden transaction; or
      forward the first write request to the first downstream port based on a determination that the first write request is not associated with the forbidden transaction; and
   wherein in the pass-through mode, the data traffic manager is configured to forward a second write request from a second upstream port to a second downstream port not based on whether the second write request is associated with a disallowed transaction.

2. The server of claim 1, wherein the data traffic manager is further configured to:
   based on a determination that the first write request is associated with the disallowed transaction:
      transmit a negative acknowledgment (NACK) signal to the first upstream port; and
      transmit a stop signal to the second downstream port.

3. The server of claim 1, wherein the data traffic manager is configured to determine that the first write request is associated with a disallowed transaction based on determining that write data associated with the first write request matches a pre-determined pattern.

4. The server of claim 1, wherein the BMC and the platform controller are also coupled with the set of downstream port pairs.

5. An integrated circuit comprising:
   a first bus interface configured to be coupled with a first hardware device;
   a second bus interface configured to be coupled with a second hardware device; and
   a control module coupled with the first bus interface and with the second bus interface, the control module being configured to:
      receive, via the first bus interface, an access request from the first hardware device to access the second hardware device;
      under a first mode of operation:
   determine, based on an access policy, whether the access request is associated with a forbidden transaction; and
      responsive to determining the access request is associated with the forbidden transaction, block at least some of data bits corresponding to the access request from the second bus interface, to prevent the forbidden transaction associated with the access request from completing; and
      under a second mode of operation: without determining whether the access request is associated with the forbidden transaction, forward the access request from the first bus interface to the second bus interface to access the second hardware device.

6. The integrated circuit of claim 5, wherein the access policy includes a list of forbidden addresses; and
wherein the control module is configured to determine that the access request is associated with the forbidden transaction based on an address associated with the access request being in the list of forbidden addresses.

7. The integrated circuit of claim 5, wherein the access policy includes a list of forbidden write data;
wherein the access request is associated with a write access request for updating data stored in the second hardware device with a set of write data; and
wherein the control module is configured to determine that the access request is associated with the forbidden transaction based on the set of write data being included in the list of forbidden write data.

8. The integrated circuit of claim 7, wherein the control module is configured to stop transmission of the set of write data after at least a part of the set of write data has been transmitted to the second hardware device via the second bus interface, to prevent the second hardware device from receiving all of the set of write data.

9. The integrated circuit of claim 8, further comprising a register controllable by the control module to store the at least a part of the set of write data, and to forward the at least a part of the set of write data to the second hardware device via the second bus interface.

10. The integrated circuit of claim 9, wherein the register is configured to introduce at least one clock cycle delay between the first bus interface and the second bus interface; and
wherein the control module is configured to, under the first mode of operation:
determine, within the at least one clock cycle delay, that the access request is associated with the forbidden transaction; and
forward the at least a part of the set of write data to the second bus interface based on replacing a last data bit of the set of write data with a stop signal to stop the transmission of the set of write data.

11. The integrated circuit of claim 5, wherein the control module is configured to determine, under the first mode of operation, not to grant the access request based on a sequence of data bits associated with the access request, the sequence of data bits comprising an address and a set of write data.

12. The integrated circuit of claim 11, wherein the control module is configured to compare the sequence of data bits against a list of patterns;
and wherein the determination of not to grant to access request is based on a result of the comparison.

13. The integrated circuit of claim 5, wherein the control module is configured to, under the first mode of operation:
receive, via the first bus interface, the access request from the first hardware device to access the second hardware device;
determine that the access request from the first hardware device is a write access request for updating data stored in the second hardware device;
determine that an address associated with the write access request is valid; and
grant the write access request based on a determination that the address is valid.

14. The integrated circuit of claim 5, further comprising a third bus interface configured to be coupled with a third hardware device;
wherein the control module is configured to:
receive, via the third bus interface, a second access request to access the second hardware device;
receive an indication that the second hardware device is unable to process the access request received from the third bus interface; and
forward the indication to the third hardware device via the third bus interface.

15. The integrated circuit of claim 14, wherein the indication comprises a negative acknowledgment (NACK) signal, or a clock line of the third hardware device coupled with the third bus interface being held at a logical zero state.

16. The integrated circuit of claim 5, wherein the first bus interface and the second bus interface are operated based on an Inter-Integrated Circuit ($I^2C$) protocol.

17. A method, comprising:
entering a first mode of operation;
in the first mode of operation:
receiving, from a first hardware device via a first bus, a first request to access a second hardware device;
based on determining not to forward the first request to the second hardware device:
transmitting, via a second bus, a stop indication based on a bus protocol to the second hardware device; and
transmitting, via the first bus, a negative acknowledgment (NACK) indication based on the bus protocol to the first hardware device
entering a second mode of operation;
in the second mode of operation:
receiving, from the first hardware device via the first bus, a second request to access the second hardware device; and
without determining whether the second request is associated with a forbidden transaction, forwarding the second request to the second hardware device via the second bus.

18. The method of claim 17, further comprising:
after forwarding the second request to the second hardware device, receiving data associated with the second request from the second hardware device;
forwarding the data to the first hardware device;
receiving an acknowledgement (ACK) from the first hardware device; and
forwarding the ACK to the second hardware device.

19. The method of claim 17, wherein determining not to forward the first request is based on a result of comparing an address or data associated with the first request against a list of patterns associated with forbidden transactions.

20. The method of claim 17, wherein determining not to forward the first request is based on determining that the second hardware device is unavailable to process the first request.

21. The integrated circuit of claim 5, wherein the control module is configured to, based on the access policy, block any access request received via the first bus interface from reaching the second bus interface.

22. The integrated circuit of claim 5, wherein the control module is configured to, in a third mode of operation, block any access request received via the first bus interface from reaching the second bus interface.

23. The integrated circuit of claim 5, wherein the control module is configured to, under the second mode of operation: based on determining that access request is associated with the forbidden transaction, transmit a first signal via the first bus interface to the first hardware device to indicate to the first hardware device to stop transmitting additional data to the first bus interface.

24. The integrated circuit of claim 5, wherein the control module is configured to, after forwarding the access request to the second hardware device via the second bus interface:
  monitor for a second signal from the second hardware device at the second bus interface, the second signal indicating that the second hardware device accepts the access request; and
  based on not receiving the second signal, transmit a third signal via the first bus interface to the first hardware device to indicate to the first hardware device to stop transmitting additional data to the second hardware device.

25. The method of claim 17, wherein the entering of the first mode of operation is based on a start of a power-up event at a server; and
  wherein the method further comprises: switching from the first mode of operation to the second mode of operation based on a completion of the power-up event at the server.

* * * * *

UNITED STATES PATENT AND TRADEMARK OFFICE
CERTIFICATE OF CORRECTION

PATENT NO. : 10,430,225 B1
APPLICATION NO. : 15/720710
DATED : October 1, 2019
INVENTOR(S) : Jason Alexander Harland et al.

Page 1 of 1

It is certified that error appears in the above-identified patent and that said Letters Patent is hereby corrected as shown below:

In the Claims

Column 29, Line 63, Claim 1:
Delete: "a sensor device configured coupled with a fifth pair of the"
Insert: --a sensor device configured to be coupled with a fifth pair of the--

Column 32, Line 28, Claim 17:
Delete: "protocol to the first hardware device"
Insert: --protocol to the first hardware device;--

Signed and Sealed this
Twenty-fourth Day of December, 2019

Andrei Iancu
*Director of the United States Patent and Trademark Office*